United States Patent [19]

Robinson et al.

[11] E Patent Number: Re. 33,382

[45] Reissued Date of Patent:* Oct. 16, 1990

[54] SELF-OILING PORTABLE BAG-CLOSING SEWING MACHINE WITH PUMP

[75] Inventors: Robert J. Robinson, Oak Brook, Ill.; David B. Johnson, Minneapolis, Minn.

[73] Assignee: AXIA Incorporated, Oak Brook, Ill.

[ * ] Notice: The portion of the term of this patent subsequent to Sep. 14, 1999 has been disclaimed.

[21] Appl. No.: 849,526

[22] Filed: Apr. 8, 1986

Related U.S. Patent Documents

Reissue of:

[64] Patent No.: 4,441,442
Issued: Apr. 10, 1984
Appl. No.: 385,921
Filed: Jun. 7, 1982

U.S. Applications:

[63] Continuation-in-part of Ser. No. 136,312, Apr. 1, 1980, Pat. No. 4,348,970.

[51] Int. Cl.[5] ..... D05B 71/00

[52] U.S. Cl. ..... 112/256; 112/11; 112/169; 112/288

[58] Field of Search ..... 112/256, 10, 11, 43, 112/169, 288; 184/6.28, 6.15, 1 A

[56] References Cited

U.S. PATENT DOCUMENTS

| | | |
|---|---|---|
| 1,825,506 | 9/1931 | Christensen . |
| 1,872,279 | 8/1932 | Hallett . |
| 1,937,019 | 11/1933 | Hamill . |
| 1,968,023 | 7/1934 | Bijur . |
| 1,973,831 | 9/1934 | Waggoner . |
| 1,981,309 | 11/1934 | Crossland et al. . |
| 2,033,992 | 3/1936 | Moller . |
| 2,088,721 | 8/1937 | Pope . |
| 2,384,590 | 9/1945 | Baldenhofer . |
| 2,425,281 | 8/1947 | Hoelscher . |
| 2,549,889 | 4/1951 | Burks et al. . |
| 2,848,967 | 8/1958 | Nicolay . |
| 2,857,981 | 10/1958 | Kokie . |
| 3,094,955 | 6/1963 | Fischbein et al. . |
| 3,109,398 | 11/1963 | Abramowicz . |
| 3,231,046 | 1/1966 | Ohrnberger . |
| 3,418,955 | 12/1968 | Attwood et al. . |
| 3,478,709 | 11/1969 | Fischbein et al. . |
| 3,716,007 | 2/1973 | Fischbein et al. . |
| 3,771,478 | 11/1973 | Tranquilla et al. . |
| 4,052,767 | 10/1977 | Dutcher . |
| 4,095,541 | 6/1978 | Dunn et al. . |
| 4,348,970 | 9/1982 | Robinson et al. . |

OTHER PUBLICATIONS

Fischbein Bag Closing Equipment Catalog No. F62, Dave Fischbein Company, pp. 2, 3, and 7.

Union Special Bulletin 200 C, Union Special Corporation, ©1973, 1975 and 1976.

Union Special Brochure, Union Special Machine Company, ©1967.

Fischbein Sewing Head Series D, Parts Illustrations, Maintenance Instructions, Adjustments Manual, Dave Fischbein Company, ©1961.

Newlong Parts List Model NP-7, Newlong Machine Works, Ltd.

*Primary Examiner*—H. Hampton Hunter
*Attorney, Agent, or Firm*—Kirkland & Ellis

[57] ABSTRACT

A combined pump and oil reservoir and oil delivery apparatus directs oil to the internal chambers of a portable sewing machine where oil is distributed by pump pressure, gravity flow, capillary action, wicking, misting and movement of machine components. Oil is pumped into a manifold leading to upper and lower main drive shaft bearings and to the needle driving assembly for subsequent dispersion during rotation and reciprocation of machine parts to fling such oil outwardly within the internal chambers to oil machinery both directly and by misting.

38 Claims, 8 Drawing Sheets

98
102
128
126
130
132
28
24
23
134
133
156
92
104
120
600
12
30
26
34
36
89
432
632
148
140
138
137
139
630
142
143
146
450
448
144
240
145
454
458
247
236
250
176
11
11
452
238
254
455
246
252
242
244
244
460
456
262
256
258
257
259
460
106
302
304
290
464
287
288
254
308
272
462
322
320
464
426
358
406
306
360
314
312
560
316
346
400
348
234
388
260
392
350
338
340
336
600
476
8
8

247
176
244
102
248
251
242

508
180
12
206
212
216
214
208
213
210
220
218
204
222

150
630
144
152
139
137
474
138
141
146
102
162

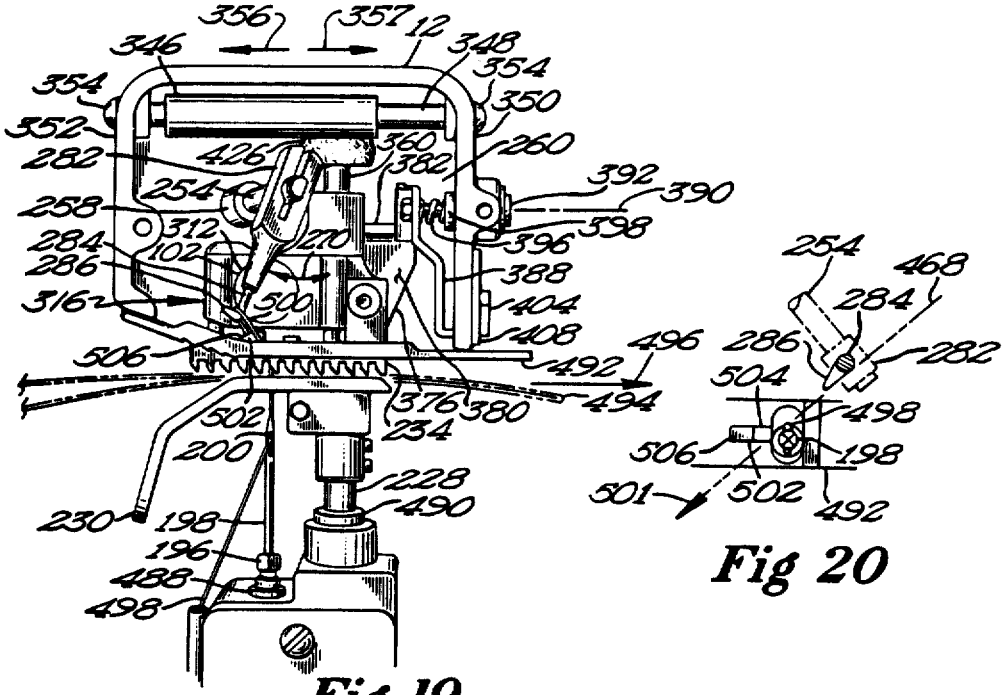
Fig 19
Fig 20
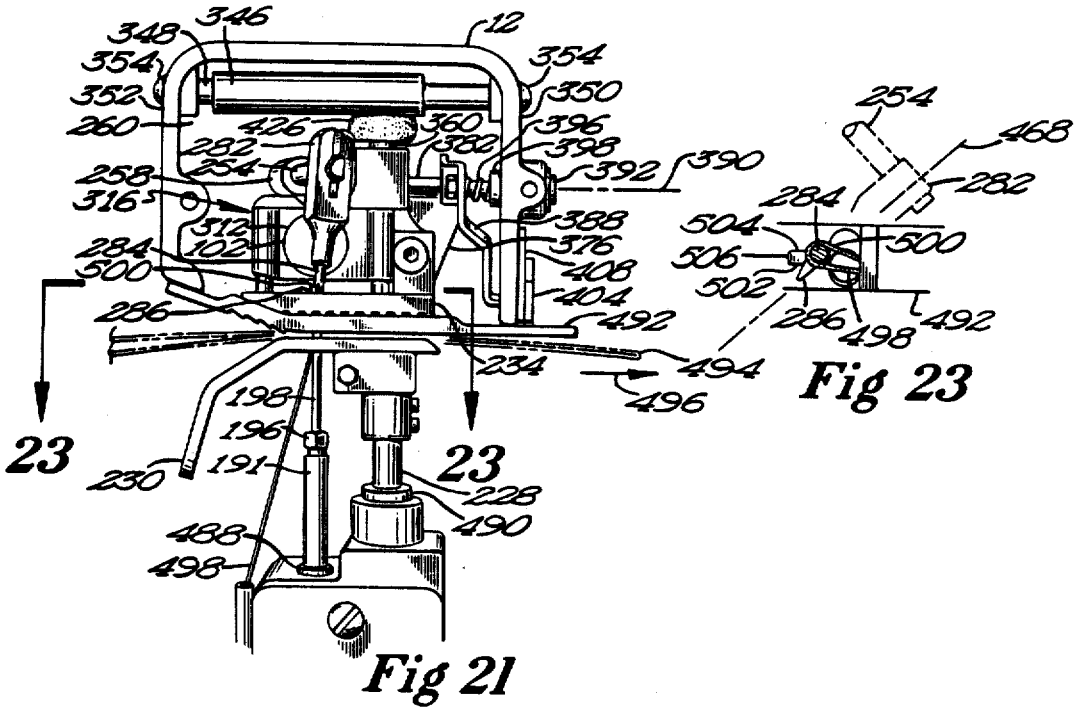
Fig 21
Fig 23

SELF-OILING PORTABLE BAG-CLOSING SEWING MACHINE WITH PUMP

Matter enclosed in heavy brackets [ ] appears in the original patent but forms no part of this reissue specification; matter printed in italics indicates the additions made by reissue.

CROSS REFERENCE TO RELATED APPLICATION

This application discloses an improvement in [the] *an* oiling system for a portable bag-closing sewing machine [which is shown in], *and is a continuation-in-part of co-pending* U.S. patent application Ser No. 136,312, *now* U.S. Pat. No. 4,348,970 by the above inventors, and which was filed on Apr. 1, 1980 and titled "Self-Oiling Portable Bag-Closing Sewing Machine".

BACKGROUND OF THE INVENTION

The present invention relates to the field of portable bag-closing sewing machines and comprises a manually actuated oiling system for a portable bag-closing sewing machine.

Portable bag-closing sewing machines are used in packaging situations where the quantity of filled bags produced and requiring closure is not continuous and where heavy, stationary machines are not practical or available. Often the bags which require closure are filled with granular, fibrous or abrasive materials and the portable machine is required to function efficiently over long periods under extremely dusty conditions and often abusive handling conditions. In some applications, the portable machines are almost round the clock duty in assembly line or shipping dock environments, and it is virtually impossible to shelter all moving parts of the machine from the dusty, abrasive materials present in the working area. To insure continued, uninterrupted operation under these conditions, regular lubrication of the machine is critical.

A self-oiling portable bag-closing sewing machine is disclosed in U.S. patent application Ser. No. 136,312 filed Apr. 1, 1980, and the invention disclosed therein has provided a highly reliable oiling system suitable for normal machine image conditions. It has been found, however, that under exceptionally severe conditions where the machines are utilized in unusually dusty, abrasive environments over long periods of time, that it is desireable to provide additional oiling capability and that certain portions of the sewing machine require more frequent application of oil and greater quantities of such oil than is the case for normal operation. Areas which require additional oil include the upper and lower main drive shaft bearings and the needle driving assembly.

Because operation of portable bag-closing machines is frequently assigned to unskilled, newly hired employees who often lack an appreciation for regular oiling of the machines, it is desireable to make the operation of the oiling system simple and uncomplicated so as to assure rapid understanding of the system's operation with a minimum of training and instruction. The present invention achieves these goals.

SUMMARY OF THE INVENTION

The invention comprises a portable bag-closing sewing machine having a self-oiling system which utilizes a variety of different oil distribution techniques including direct pumping, gravity flow, centrifugal flinging of oil, depositing of oil from an oil mist within the machine, capillary action, and storing of oil in tubing, wicking, and porous gaskets for subsequent release to moving parts as needed. The incorporation of these oil techniques assures reliable delivery of the oil to all moving parts within the machine and increases the useful life of the machine substantially in even the most grueling and abrasive packaging situations.

The invention utilizes a manually actuated pump and adjacent oil reservoir whose oil level may be easily inspected by casual observation. Oil moves from reservoir to pump for subsequent pumped injection into an oil manifold which communicates with the drive train chamber of the machine.

The pump forces oil into the manifold, from which oil is directed to the upper and lower main drive shaft bearings and the needle driving assembly. Both drive shaft bearings are provided with internal oil channels to assist in distributing oil evenly throughout the bearing. Excess oil from the bearings gradually seeps from the bearings and enters the adjacent drive train chamber for further distribution.

Much of the oil introduced to the drive train chamber from the upper main bearing is received on a rotating eccentric collar and rotating looper cam which turn at high velocities to fling the oil droplets outwardly against the interior walls of the drive train chamber to shatter the droplets against the walls and create a mist of oil throughout the drive train chamber. Oil thrown outwardly from the collar and the looper cam is also showered on the various moving components positioned within the drive train chamber to provide direct lubrication to such components.

Tubing extends between the oil manifold and the lower main bearing and such tubing stores oil therein for gradual gravity flow into the lower bearing, providing a continual direct oil supply to the lower bearing.

Additional tubing extends from the manifold toward the needle driving assembly and terminates in a nozzle for squirting of oil onto the needle lever to supply additional oil to a region of the drive train chamber that is otherwise harder to lubricate.

A variety of oil channels, wicking, oil accumulation troughs and the like store and direct oil throughout the drive train chamber so as to lubricate all moving parts and bearing surfaces.

Oil dispersed within the drive train chamber eventually reaches the bottom of such chamber and then flows into the feed dog chamber positioned beneath the drive train chamber. Such oil is then distributed throughout the feed dog chamber by a combination of gravity flow and by the establishing of a mist of oil in the feed dog chamber by outward flinging of oil drops by a rapidly moving feed dog block.

Besides having specific utility in the bag-closing field, the portable self-oiling sewing machine is useful in many other fields in which materials, mats or fabrics must be joined and such fields often involve working environments in which regular lubrication is essential to the sewing machine. Accordingly, the need for a self-oiling sewing machine such as that described herein extends well beyond the bag-closing art.

These and other advantages of the invention will appear from the following drawings and detailed description in which like parts carry identical numbering in the several views.

BRIEF DESCRIPTION OF THE DRAWINGS

FIG. 19 is a bottom view of the feed dog chamber of the sewing machine of FIG. 1 and showing the interaction of the feed dog assembly, the looper assembly, the needle driving assembly, and the thread chain cutting assembly.

FIG. 20 is a side view taken in the direction of cutting plane 20—20 of FIG. 14 and showing the path of the looper and the interaction between the looper assembly and the needle.

FIG. 21 is a bottom view of the feed dog chamber illustrating the operation of the feed dog, looper, needle driving and thread cutting assemblies.

FIG. 23 is a side view of the looper and its interaction with the needle and the thread and is taken in the direction of cutting plane 23—23 of FIG. 21.

DESCRIPTION OF THE PREFERRED EMBODIMENTS

Figure 1:
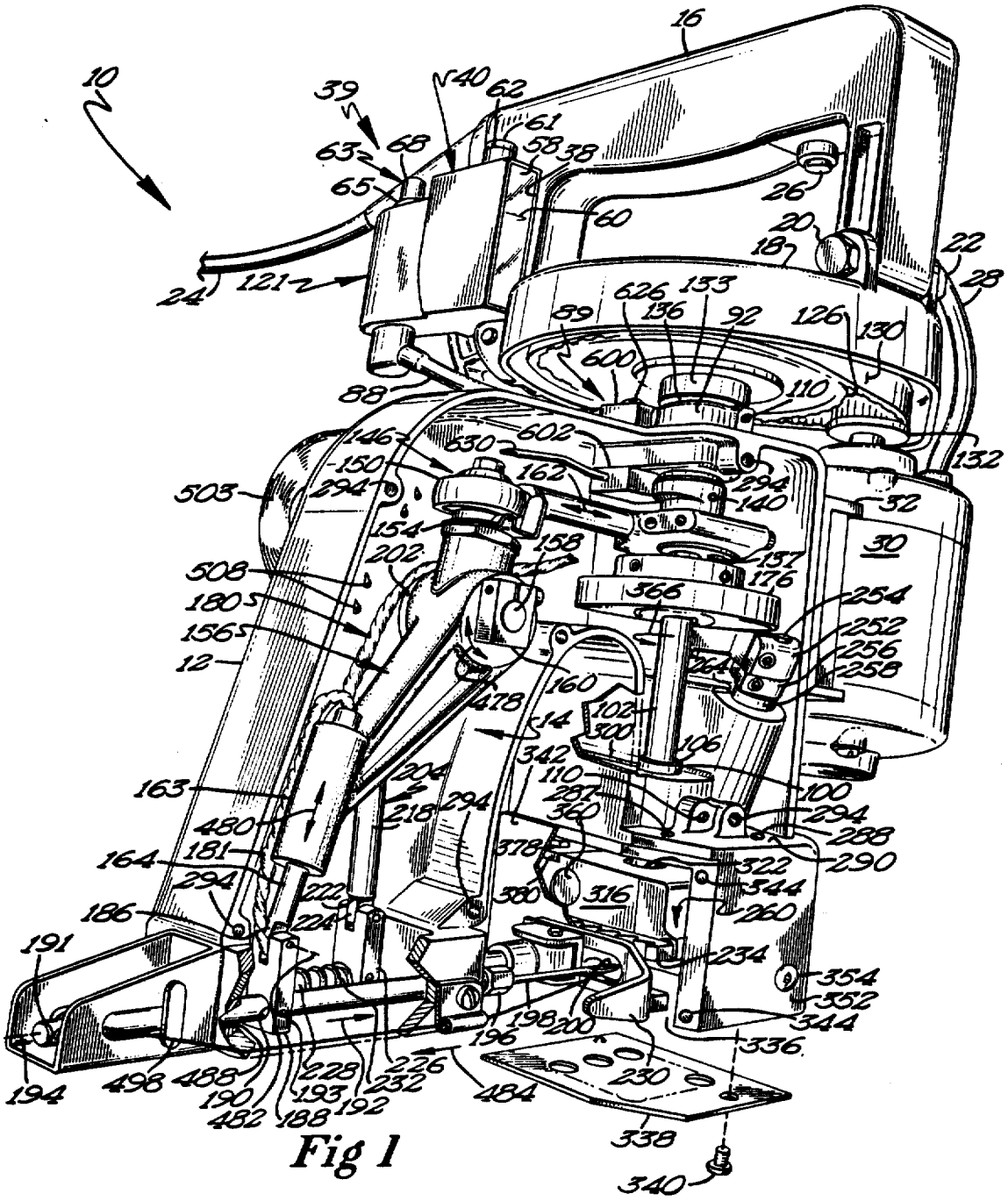
FIG. 1 is a front perspective view of a self-oiling portable bag-closing sewing machine taken partially in section and with the front cover removed to better show the interior of the drive train chamber.

Referring now to FIG. 1, a self-oiling portable bag-closing sewing machine 10 utilizes a rigid protective housing 12 which is provided with a hollow, generally U-shaped, internal drive train chamber 14 and a feed dog chamber 260. The housing 12 also includes appropriate cover plates 292, 342 and 338. The housing 12 further includes a handle means 16 at the top of the machine 10 and a rigid guard 18 affixed to the handle 16 by bolt 20 and nut 22 to protect an operator from accidental entanglement in the gear 126 described hereafter.

Figures 7, 8, 10, 11:
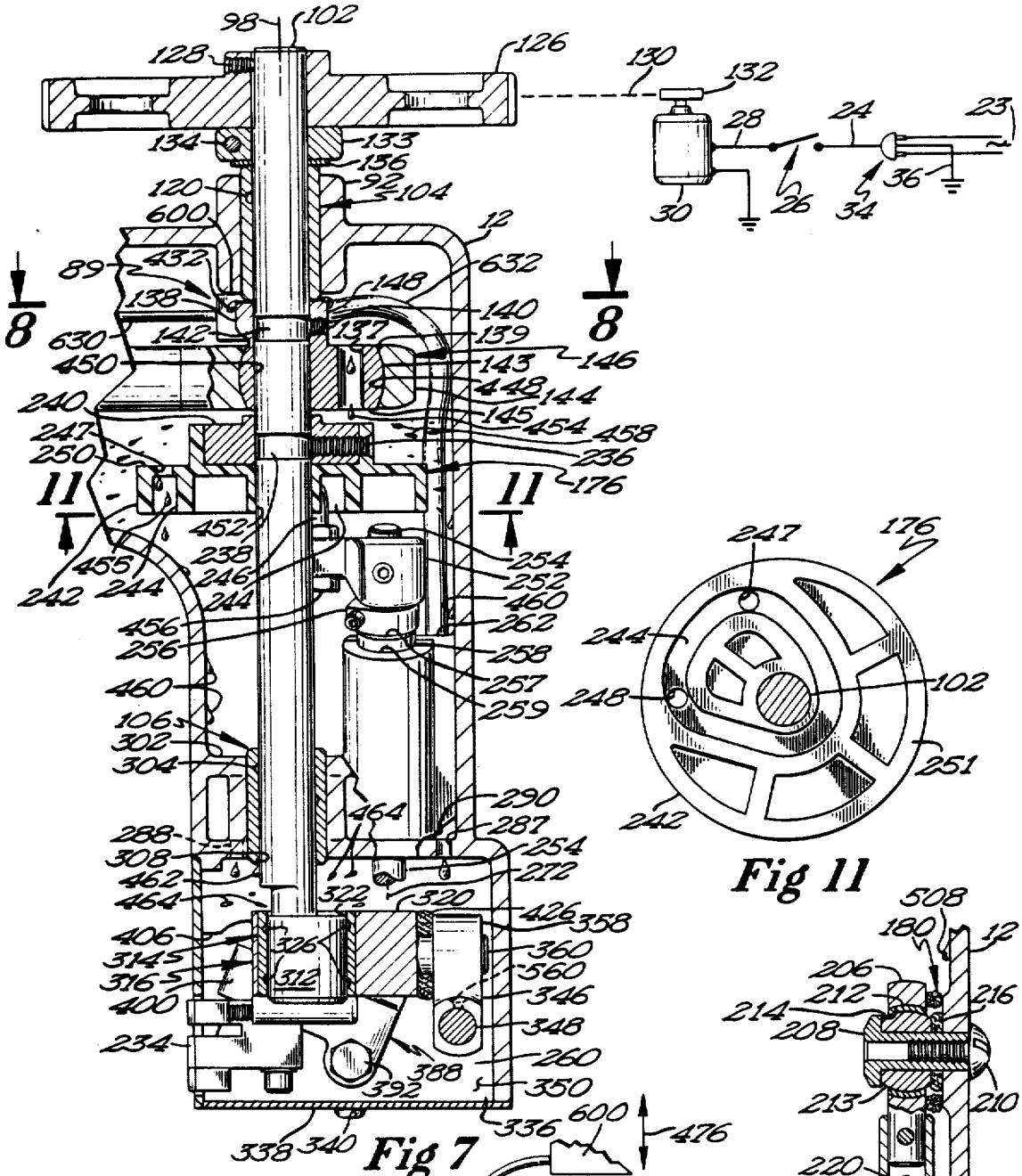
FIG. 7 is a front cross-sectional view of a portion of the drive train and feed dog chambers of the sewing machine of FIG. 1.
FIG. 8 is a top cross-sectional view of the eccentric collar and connecting rod taken in the direction of cutting plane 8—8 of FIG. 7.
FIG. 10 is a cross-sectional view taken in the direction of cutting plane 10—10 of FIG. 9 and showing structure by which the presser foot unit is lubricated.
FIG. 11 is a bottom view of the looper cam taken in the direction of cutting plane 11—11 of FIG. 7.

Referring now to FIGS. 1 and 7, an electrical power cord 24 enters the handle 16 and is operatively electrically connected with push button switch 26 which when depressed by an operator may be used to close a circuit permitting electrical current to flow from a power source 23 to the power cord 24, through switch 26, along cord 28 to motor 30 which is securely mounted to the housing 12 by means of bracket 32. The motor and housing 30 and 12, respectively, are preferably grounded as is well known to the art by use of a three-pronged plug 34 having a ground connection 36. Alternatively, a double insulated case may be employed as is also well known to those skilled in the art.

Figure 24:
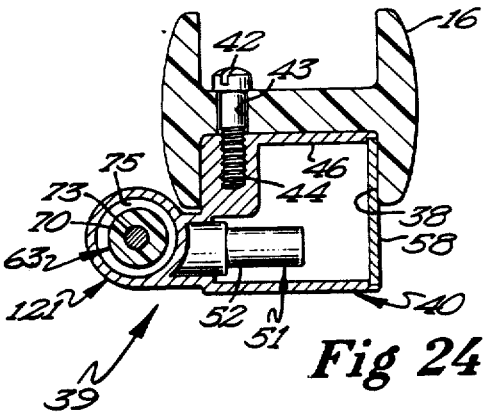
FIG. 24 is a cross-sectional view through the combined pump and reservoir and taken in the direction of cutting plane 24—24 of FIG. 3 and showing the mounting of the reservoir to the handle.

The handle 16 is preferably provided with a recessed slot 38 as best shown in FIG. 24 so as to provide a convenient place for receiving and carrying the combined oil reservoir and pump housing 39. While the housing 39 may be attached to or carried by the housing 12 in any known way, the housing 39 is here shown (FIGS. 2 and 24) as being detachably mounted to the handle 16 by a mounting screw 42 which extends through aperture 43 in the slot 38 and is threaded into socket 44 in the wall 46 of housing 39.

The combined reservoir and pump housing 39 is formed of an oil resistant material, a plastic or plastic-like transparent or translucent material being preferred. The housing 39 is molded as an integral unit with an oil reservoir chamber 47 and a pump chamber 48, such chambers communicating through circular cross section pump inlet 49 which has an enlarged concentric segment 50 into which a pump inlet check valve 51 is force fitted or otherwise retained by any means known to the art.

The pump check valve 51 includes a brass sleeve 52 having an annular valve seat 53 at one end thereof. A spring 55 extends between shoulder 56 of segment 50 and valve ball 57 and applies light retaining force against the ball 57 to keep the valve 51 in the normally closed position against valve seat 53 as shown in FIG. 3.

The oil reservoir chamber 47 is formed with an open end to be later closed by lateral sidewall 58 to facilitate insertion of the pump inlet check valve 51. After installation of the valve 51, the sidewall 58 is permanently sealed to the housing 39 by gluing or other means known to the art. The wall 58 is preferably formed of a translucent or transparent material to enable an operator to visually inspect the oil level 60 within the chamber 47. A detachable cap 61 is provided to close the oil filler aperture 62, permitting easy addition of oil as required. The rear wall 46 of the oil chamber 47 extends rearwardly relative to the remainder of the housing 39 and is contoured to fit snuggly within slot 38 in the handle 16. A mounting screw 42 passes through aperture 43 in slot 38 and is threaded into socket 44 in the wall 46 of the reservoir 40, thereby snugly protectively retaining the reservoir within the slot 38 of the handle.

Figure 3:
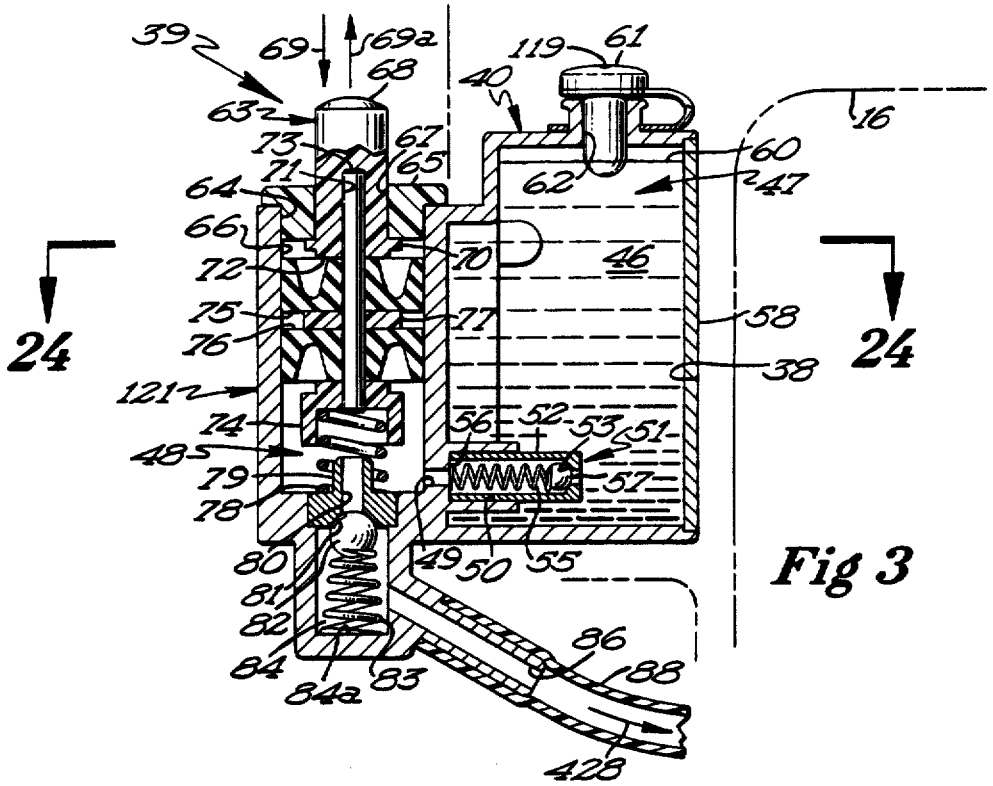
FIG. 3 is a cross-sectional view through the combined pump and oil reservoir of the machine taken in the direction of cutting plane 3—3 of FIG. 2.

Referring now to FIG. 3, pump chamber 48 includes an open circular top 64 which after pump assembly is closed by a circular chamber lid 65 being permanently bonded to the sidewall 6 of chamber 48 to provide a permanent seal. The lid 65 has a centrally located circular aperture 67 to slidably receive plunger button 68. The plunger button 68 is slidably moveable in aperture 67 in downward and upward directions 69 and 69a, respectively. An annular shoulder 70 near the base of the plunger button 68 engages the bottom of lid 65 and provide a stop to prevent overtravel of the button 68 in direction 69a.

The plunger button 68 is provided with a central vertical bore 71 to retain a generally vertical orientated rod 73 which has its lower end force fitted into spring containment cup 74.

Confined between the bottom 72 of the button 68 and the top of the cup 74 are upper and lower neoprene sealing gaskets 75 and 76, respectively, which are separated by nylon washer 77, and which tightly sealably engage the cylindrical sidewall 66 of the pump chamber 48 to prevent upward escape of oil from the chamber.

A coil spring 78 has its upper end retained within cup 74 and its lower end supported about upwardly extending nipple 79, the spring 78 being under compression so as to urge the cup 74, and 73 and plunger button 68 upwardly to their rest position wherein the shoulder 70 contacts the bottom of lid 65.

The plunger button 68, rod 73, gaskets 75 and 76, washer 77 and cup 74 collectively comprise a slidably mounted plunger 63 for upward and downward movement within pump chamber 48 and useable for pumping oil from the chamber 48.

The upright nipple 79 has a central passage 80 which terminates at outlet valve seat 81. A ball valve 82 is retained in the closed position shown in FIG. 3 by a compressed coil spring 83 which extends between the ball 82 and the floor 84a of exit chamber 84.

Figure 2:
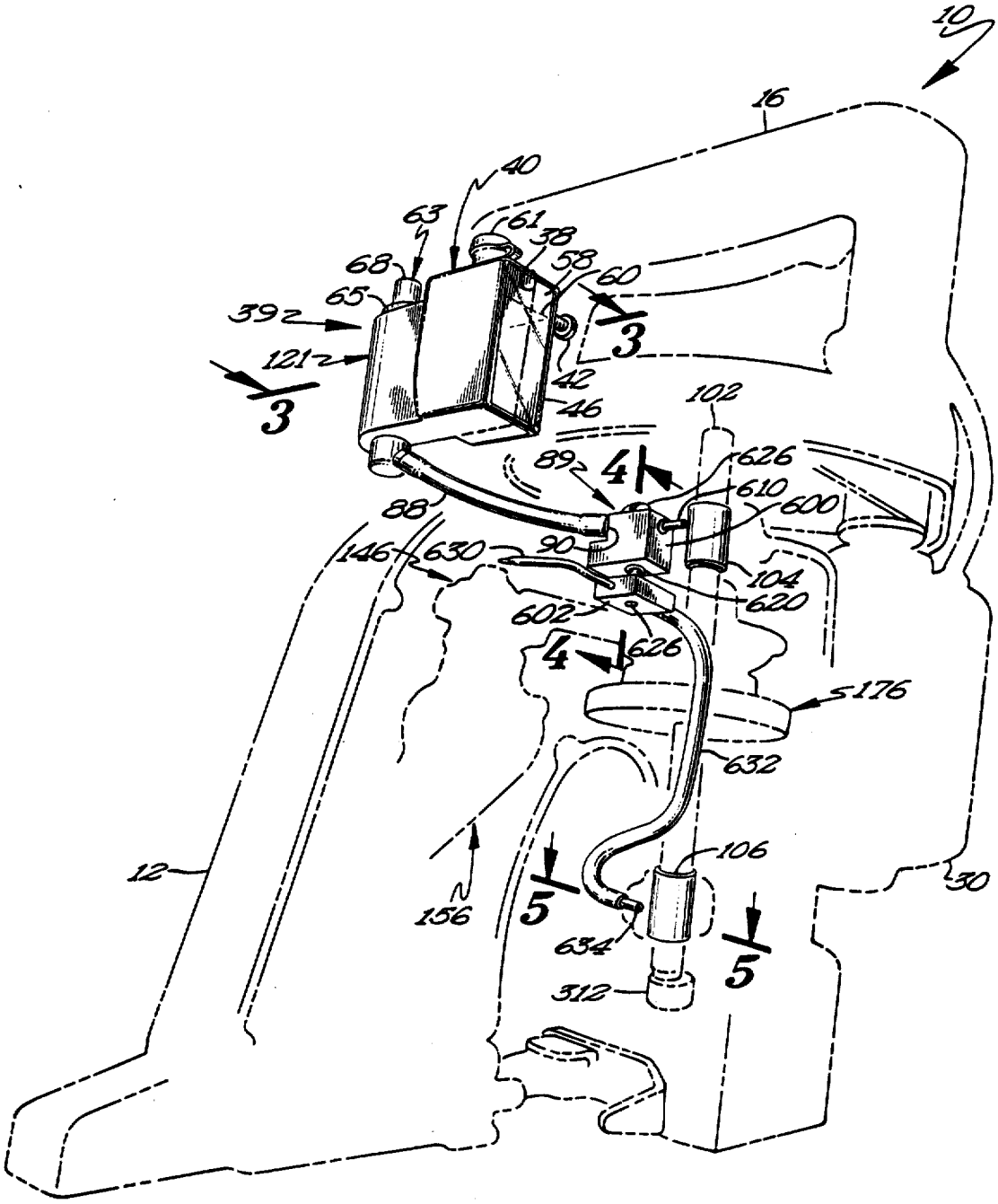
FIG. 2 is a perspective view of the combined pump and oil reservoir, the oil manifold, and the hoses and nozzle which delivers oil to the interior of the machine with the machine housing and certain internal parts shown in phantom.
Figure 4:
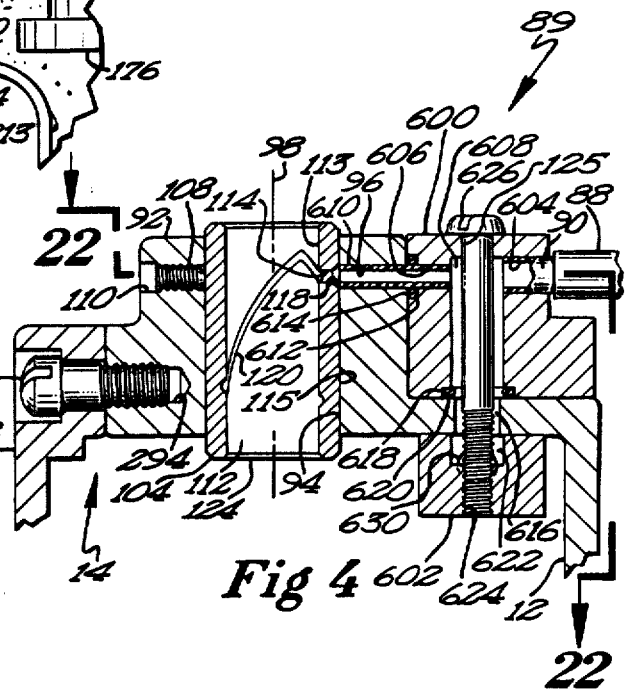
FIG. 4 is a cross-sectional view of the oil manifold and upper main drive shaft bearing taken in the direction of cutting plane 4—4 of FIG. 2.

The exit chamber 84 communicates with downwardly extending male hose coupling 86 which defines the pump outlet and over which a flexible connecting hose or tube 88 is snuggly fitted. As best shown in FIGS. 2 and 4 the hose extends to nipple 90 of oil manifold 89.

Accordingly, the pump chamber 48, plunger 63, spring 78, the inlet and outlet check valves, and outlet 86 collectively comprise a selectively actuatable pump 121 which is useable with the invention and can be operated by the user at regular intervals during service.

Figure 22:
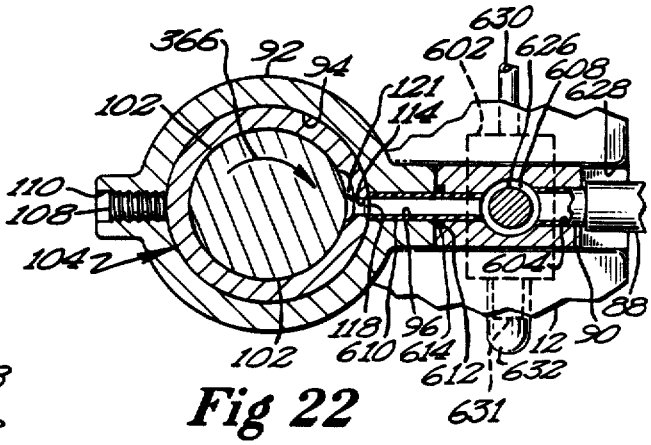
FIG. 22 is a cross-sectional view of a part of the housing and of the upper main drive shaft bearing taken in the direction of cutting plane 22—22 of FIG. 4.

Referring now to FIGS. 2, 4 and 22, an oil manifold 89 includes upper manifold 600 and lower manifold 602 with upper manifold 600 being positioned outside of and on top of the housing 12 and lower manifold 602 being positioned beneath upper manifold 600 and within the drive train chamber.

The upper manifold 600 may be formed of any suitable material capable of withstanding and containing oil therein and is provided with a manifold inlet port 604 into which hose coupling 90 is sealably received. A first manifold outlet port is provided by brass fitting 610 which is force fitted into aperture 606 and communicates with a generally vertical cylindrical plenum 608 into which oil is delivered from inlet port 604. The brass fitting 610 extends laterally into oil bore 96 of boss 92, as described further hereafter. An annular slot 612 encircles outlet port 606 and receives sealing "O" ring 614, which when compressed between manifold 600 and boss 92 forms a tight oil seal therebetween.

An oil delivery hole 616 extends through the top of the housing 12 adjacent boss 92 and communicates directly, axially with cylindrical plenum 608 as best shown in FIG. 4. An annular slot 618 is formed in the bottom of the upper manifold 600 concentric with the plenum 608, and receives an annular "O" ring 620, which when compressed between the housing 12 and the upper manifold 600 provides a tight oil resistant seal.

The lower manifold 602 includes a central, generally upright cylindrical plenum 622 which communicates with the oil hole 616, and upper plenum 608. A threaded bore 624 positioned coaxially with the upper and lower plenums 608 and 622 retains the lower end of machine screw 626 which passes through hole 125 in the top of the upper manifold and through the oil hole 616 before being threaded into bore 624. The plenums 608 and 622 are provided with a larger diameter than that of the screw 626 to provide ample clearance therearound to allow downward flow of oil from the upper manifold 600 to the lower manifold 602. When screw 626 is tightened into threaded bore 624, the "O" rings 620 and 614 are compressed against the housing 12 and boss 92, respectively to provide adequate oil-tight seals. Placement of the upper manifold 600 in slot 628 formed in the housing 12 and best shown in FIG. 22 provides additional protection and stability for the upper manifold and further assures a tight sealing fit between the "O" rings and the housing.

Referring now to FIG. 22, the plenum 622 also communicates directly with a second manifold outlet port 631 which connects to oil delivery hose 632 which extends to the lower main drive shaft bearing 106. A third manifold outlet port connects plenum 622 to outwardly extending nozzle 630 which extends laterally to and overlies the needle driving assembly to apply oil directly thereto.

The hose 632 extends downwardly from lower manifold 602 and within the drive train chamber 16 until it reaches a ledge 262 as best shown in FIG. 7. An aperture is bored in ledge 262 to permit the hose 632 to pass therethrough and to thereafter be connected with nipple 634 which is threadably retained within a threaded bore 636 which extends to bearing aperture 100 of lower main drive shaft bearing 106. Accordingly, the hose 632 delivers oil directly to the lower main drive shaft bearing for lubrication of the bearing and additionally stores oil for downward seepage into the bearing. The internal structure of the lower main drive shaft bearing will be discussed further hereafter.

The upper and lower oil manifolds, the attached nozzle 630, hoses 88 and 632 and nipples 610 and 634 collectively comprise an oil delivery means for transferring oil from the oil manifold 89 to the bearings 104 and 106 and to the needle driving assembly. Although these specifically identified components are shown as illustrative of the invention, it should be understood that other types of oil transfer hardware which accomplish the same purpose may be substituted therefore and are within the scope of the invention.

A nipple 86 extends outwardly from the pump housing 72 and communicates with exit chamber 84. A flexible connecting tube or hose 88 fits tightly over the nipple 86 to direct oil flow from the valve 68 to a second nipple 90 (FIG. 5) which is threaded into boss 92 of housing 12.

Referring now to FIG. 4, the boss 92 is cast as an integral part of the housing 12 and has a generally cylindrical configuration with a bearing aperture 94 bored axially therealong. The brass tube 610 which defines a first manifold outlet port is received in oil delivery bore 96 which communicates with the aperture 94, permitting oil flow from the oil manifold 89 to the aperture 94. The aperture 94 has a central longitudinal axis 98, and a second bearing aperture 100 (FIG. 1) is positioned coaxially with the aperture 94 so that apertures 94 and 100 can receive coaxially aligned first and second main drive shaft bearings 104 and 106, respectively, which rotatably journal generally upright main drive shaft 102.

Figure 5:
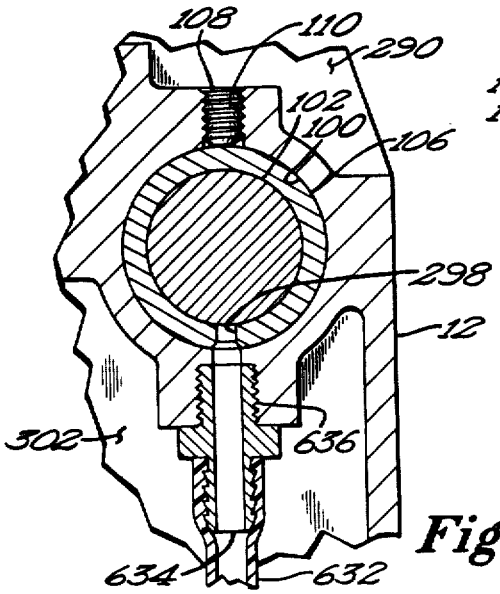
FIG. 5 is a cross-sectional view of a portion of the housing and showing the lower main drive shaft bearing of the machine, the view taken in the direction of cutting plane 5—5 of FIG. 2.

The upper and lower main drive shaft bearings 104 and 106, respectively, are retained within apertures 94 and 100, respectively, by one or more set screws 108 received within threaded apertures 110 as best shown in FIGS. 1, 4 and 5. Accordingly, the bearings 104 and 106 are positioned to have a common central longitudinal axis 98 and rotatably receive main drive shaft 102 therein and retain the drive shaft in the shown upright orientation of FIG. 1.

Figure 6:
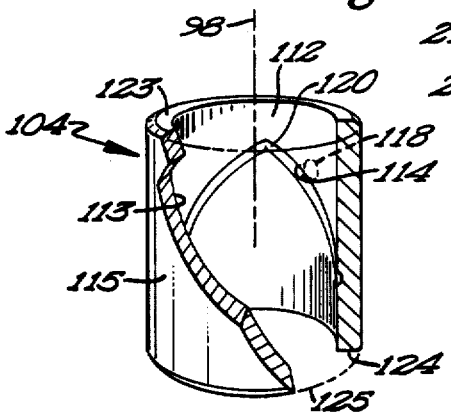
FIG. 6 is a perspective, partially cut away view of the upper main drive shaft bearing used with the machine.

Referring now to FIGS. 4 and 6, upper main drive shaft bearing 104 is cylindrical in configuration with a central longitudinal aperture 112 in which main drive shaft 102 is received. The bearing 104 has an oil port 114 extending radially outwardly therethrough from inner periphery 113 to outer periphery 115, and the bearing 104 is oriented so that port 114 communicates with oil delivery bore 96 and tube 610 of the oil manifold 89. Preferably the oil port 114 has an outer countersink 118 (FIG. 4) to simplify alignment between port 114 and opening 116.

Referring now to FIG. 6, integral, one-piece bearing 104 has upper and lower ends 123 and 124, respectively, and is provided with an oval shaped generally continuous oil channel 120, about the inner periphery 113.

The oval oil channel 120 is cut into the inner periphery 113 of bearing 104 so as to move oil laterally of the oil port 114 and communicates with the oil port 114. Oil delivered to the channel 120 drains downwardly along the inner periphery 113 of the bearing and flows slowly out the lower end 124 of the bearing. The operation of oil channel 120, will be described further hereafter.

Referring next to FIGS. 1 and 7, a pulley wheel 126 is rigidly attached to the main drive shaft 102 at the upper end thereof by any known means such as one or more set screws 128 so that pulley wheel 126 rotates with drive shaft 102. A timing belt 130 extends about the outer rim of pulley wheel 126 and to and around pulley 132 which is affixed to the shaft of motor 30. The motor 30, pulleys 132 and 126, timing belt 130 and main drive shaft 102 collectively comprise a driving means for rotating the main drive shaft when motor 30 is energized.

A split collar 133 (FIGS. 1 and 7) is rigidly secured to drive shaft 103 by tightening screw 134 and provides a convenient device for adjusting the degree of permitted end play of shaft 102. A thrust washer 136 is positioned immediately beneath split collar 133 and contacts the upper end 123 of bearing 104 to assure that any rough edges of split collar 133 will not cut or wear down the bearing 104.

Referring again to FIGS. 1 and 7, a needle drive eccentric collar 138 is rigidly attached to the drive shaft 102 adjacent bearing 104 by set screw 140 which is received in annular recess 142 of shaft 102. The eccentric 138 is rotatably received in a first end 144 (FIGS. 7 and 8) of needle drive connecting rod 146 and has a projection 148 which extends upwardly from the connecting rod and along shaft 102.

Referring now to FIGS. 1 and 8, connecting rod 146 has a second end 150 which is provided with a universal mounting 152, the mounting 152 receiving a first end 154 of needle drive lever 156 which is swingably mounted for reciprocating rocking movement in directions 478 about post 158 when rotation of shaft 102 causes rod 146 to move reciprocatingly in directions 162. The post 158 is fixed to the housing 12 and extends outwardly from it in cantilever fashion. The needle drive lever 156 is retained on post 158 by split collar clamp 160.

An annular oil accumulation groove 139 between rotating collar 138 and connecting rod 146 tends to accumulate oil dropping on the top 141 of the eccentric and guides it into the outer periphery 143 of the eccentric collar so as to insure adequate lubrication between the collar and the connecting rod. One or more oil bores 137 are formed in the eccentric collar 138 and extend from the upper surface 141 to the lower surface 145, the two shown oil bores serving to pass oil by gravity flow from the upper surface 141 to the lower surface 145 of the collar 138 to insure some downward movement of oil adjacent shaft 102.

Rotation of eccentric collar 138 tends to urge any oil thereon outwardly from the shaft 102 and flings such oil radially outwardly against the interior walls of the drive train chamber and directly onto universal joint 152 to provide needed lubrication of the universal joint. The universal joint also receives direct lubrication from oil ejected from nozzle 630, which overlies the joint 152. Oil 458 flung rapidly outwardly from the rotating eccentric showers the moving components within the chamber 14 and is also hurled at the interior walls of the drive train chamber 14 and on striking the walls is substantially fragmented into a multiplicity of fine droplets so as to create a mist of oil within the drive train chamber as illustrated in FIG. 9.

Figure 9:
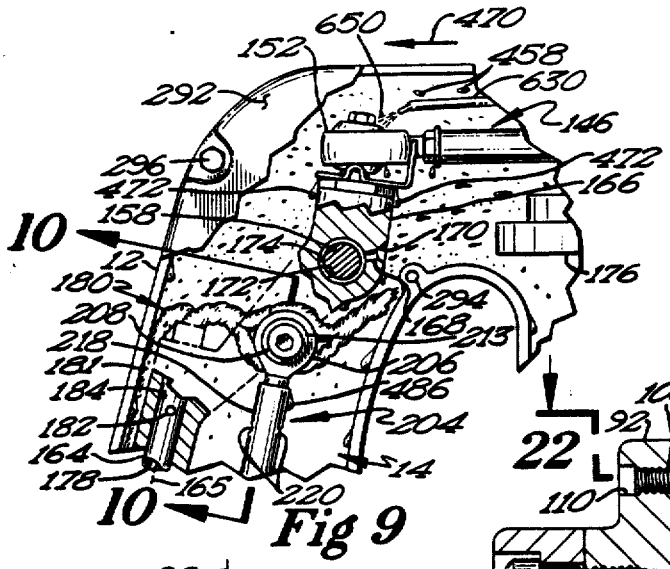
FIG. 9 is a front view of a portion of the drive train chamber of the sewing machine of FIG. 1 and taken partially in section and phantom to show the manner in which a part of the needle driving assembly is constructed and lubricated and to display a portion of the presser foot unit and the structure for its lubrication.

Referring now to FIGS. 1 and 9, the needle lever 156 has its second end 162 provided with an elongated section or sleeve 162 having an elongated interior bearing aperture 184 which slidably receives longitudinal shaft 164 therealong. The side 166 of needle drive lever 156 has an oil port 168 formed therein and which is countersunk at 170 to provide a larger opening for receiving of oil as will be described further hereafter. The internal bearing surface 172 of the needle drive lever 156 has an annular slot 174 which closely confronts the post 158 and communicates with the oil port 168 so that oil introduced into the port 168 reaches the annular slot 174 to provide lubrication to the bearing surface 172 and the post 158. The countersink 170 is positioned adjacent and confronting the drive shaft 102, collar 138, and cam 176 connected thereto, so that oil 458 flung radially outwardly by the rotating cam 176 and collar 138, as will be described further hereafter, showers the needle drive lever 156, penetrates directly into the countersink 170 or lands on the lever 156 so that accumulating droplets above the countersink 170 will run into the countersink and thereby reach the annular slot 174. Some oil from the nozzle 630 also is received in countersink 170 as the oil flows downwardly along side 166.

Referring again to FIGS. 1 and 9, the longitudinal shaft 164 has a central axis 165 and a hollow axial passage 178 into which a length of oil-transmitting wicking 180 is inserted with a long trailing wicking section 181 extending to clamp 188. The wicking 188 which extends outwardly from the hollow interior passage 178 of longitudinal shaft 164 extends downwardly and is wrapped about the lower end 186 of shaft 164 and between the bifurcations of clamp 188 so that oil from the wicking lubricates the pivotal mounting between the shaft 164 and clamp 188 and may also work its way downward by gravity flow to shaft 191. The wicking 180 is a fibrous oil-absorbing medium which readily collects oil from within the drive train chamber 14 and transmits it along the fibrous wicking so that oil may be spread outwardly along the wicking and transferred to various components, a concept well known to the art.

The longitudinal shaft 164 is provided with one or more radial oil ports 182 which pass through the cylindrical wall of the shaft 164 so that oil delivered within its axial passage 178 is released outwardly through the ports 182 and consequently is applied to the interior bearing aperture 184 of the sleeve 163, assuring adequate lubrication between the shaft 164 and elongated section 163.

The lower end 186 of shaft 164 is pivotally mounted to a bifurcated clamp 188 (FIG. 1), the clamp 188 having a bore 190 through which is passed needle drive shaft 191. A set screw 193 securely attaches the clamp 188 to the needle drive shaft 191 so that rocking movement of the needle drive lever 156 about pivot post 158 causes the needle drive shaft 191 to be slidably moved in directions 192 and 484 along its axis 194 and through bearings 488 (FIGS. 1 and 19). The longitudinal shaft 164 and bifurcated clamp 188 collectively comprise a needle bar clamp which is useful in converting rocking motion of needle lever 156 to the axial sliding motion required of needle drive shaft 191. A needle chuck 196 is provided at one end of the shaft 191 to receive and retain a heavy duty sewing needle 198 having a thread aperture 200. It is desirable to lubricate the bearings 488 through which the needle drive shaft slides and such lubrication is accomplished by oil drops or mist falling from above the shaft 191 and then being introduced into the bearings 488.

The eccentric collar 138, connecting rod 146, needle drive lever 156 swingably retained on pivot post 158, longitudinal shaft 164, bifurcated clamp 188, and slidably mounted needle drive shaft 191 and its associated chuck 196 and needle 198 collectively comprise a needle driving assembly usable with the portable bag-closing machine.

The wicking 180 which was described earlier in conjunction with the longitudinal shaft 164 is also twisted about the pivot post 158 to assist in oil being supplied to the interface 202 (FIG. 1) formed between the needle drive lever 156 and the annular surface of the housing 12 immediately surrounding the post 158. Referring now to FIGS. 1 and 9, additional oil reaches the interface 202 from downward flow of oil 508 along the interior wall of the chamber 14 and by outward spraying of oil 458 from cam 176 and collar 138. Oil ejected from nozzle 630 also aids lubrication of interface 202, and the oil mist generated during operation of the machine provides further oil accumulation in this region.

Referring now to FIGS. 1, 9 and 10, a presser foot lifter lever 204 has its upper end 206 swingably mounted to a cantilevered post 208 which is retained to the housing 12 by screw 210. A bearing 212 is interposed between an aperture 214 of the lifter lever and the post 208, and an oil-absorbing felt washer 216 is positioned between the housing and self-aligning insert 213 of the lifter lever. Wicking 180 is twisted about the cantilevered post 208 in close proximity to the upper end 206 and to the felt washer 216 so that oil from the wicking will impregnate the felt washer and transfer such oil to the bearing. The bearing 212 also obtained oil from droplets 508 running down the wall of housing 12, from oil flow originating at nozzle 630 and from oil 458 sprayed from the cam 176 and collar 138. The presence of the oil mist within the chamber 14 during operation assures further oil deposit on the post 208, wicking 180 and washer 216.

The lifter lever 204 has a downwardly extending hollow longitudinal shaft 218 which is provided with oil ports 220 passing diametrically entirely through the wall of the hollow shaft 218 at opposed peripheral sides of the shaft 218 so that oil running down the outer periphery of the shaft 218 will find its way into the ports 220 so as to lubricate the inner periphery of shaft 218. A rod 222 is received within the hollow shaft 218 for telescoping sliding movement into and out of the hollow shaft 218. The presence of oil ports 220 assures adequate lubrication within the hollow shaft 218 so that sliding rod 222 moves freely therein.

The lower end 224 of the rod 222 is pivotally mounted to bifurcated clamp 226 which in turn is rigidly clamped to presser foot shaft 228. Presser foot shaft 228 is mounted for sliding movement along its longitudinal axis by a pair of bearings like those used for needle shaft 191 and carries presser foot 230. A coil spring 232 is carried on shaft 228 and is interposed between the housing 12 and the bifurcated clamp 226 to urge the presser foot shaft in the direction 192 and bias the presser foot 230 firmly against throat plate 342 for interaction with feed dog 234.

The lifter lever 204, post 208, telescoping rod 222, bifurcated clamp 226 which pivotally receives rod 222, slidably mounted presser foot shaft 228, presser foot 230, and spring 232 collectively comprise a presser foot unit for retaining a bag between the presser foot 230 and the feed dog 234 during operation of the machine.

Referring now to FIGS. 1 and 7, a substantially circular looper cam 176 is rigidly retained to the shaft 102 by one or more set screws 236 which bear against a recessed portion 238 of the shaft 102 so that cam 176 rotates with shaft 102 and at the same angular velocity. Cam 176 has an upwardly extending cap 240 which is positioned directly beneath oil bores 137 of eccentric collar 138 and receives oil therefrom by gravity flow so that during normal rotational motion of the cam 176 such oil may be flung radially outwardly from the cam as best shown in FIG. 9 so as to cause the oil droplets to shower other components within chamber 14 and to strike the interior walls of the drive train chamber 14 and shatter against such walls in order to substantially fragment the oil droplets and form a mist of oil throughout the drive train chamber. This oil mist spreads to all parts of the chamber 14 and tends to work its way into the joints and bearing surfaces in the drive train chamber and is deposited on the various moving parts and shafts to provide needed lubrication throughout the chamber. It should be understood that the entire cam 176 and not merely the cap 240 participates in flinging oil radially outwardly, and it will be appreciated by those skilled in the art that as the machine 10 is actuated, the speed of the shaft 102 will gradually increase from zero to its normal operation speed of approximately 1,000 to 1,500 revolutions per minute and at stoppage will gradually decrease to a zero speed. During the changes in speed occasioned by stopping and starting, the angular velocity of the cam 176 and, of course, the eccentric 138 changes and accordingly the centrifugal force generated and applied to the oil by eccentric and cam varies and causes the oil in some cases to be thrown almost horizontally outwardly and, in other cases, when the angular velocity is lower, to be flung in a more downwardly curving trajectory. The result of these speed variations is that the outwardly flung oil does not always follow the same trajectory and, much like a garden sprinkler, the path of the oil droplets is closely dependent on the force with which the droplets are thrown outwardly. This variation in velocity causes the droplets to be flung over a larger area with the droplets falling more sharply downwardly at slow speed and being thrown almost horizontally outward at high speed.

Referring now to FIGS. 7 and 11, the looper cam 176 has a lower, larger diameter section 242 with upper and lower faces 250 and 252, respectively, a continuous cam follower slot 244 being formed in lower face 251 to slidably receive a cam follower. Oil flow holes 247 and 248 pass vertically through the section 242 extending from the upper face 250 downwardly and directly into the cam follower slot 244 so that oil is delivered to the slot to provide needed lubrication between the slot and the cam follower 246.

Figure 12:
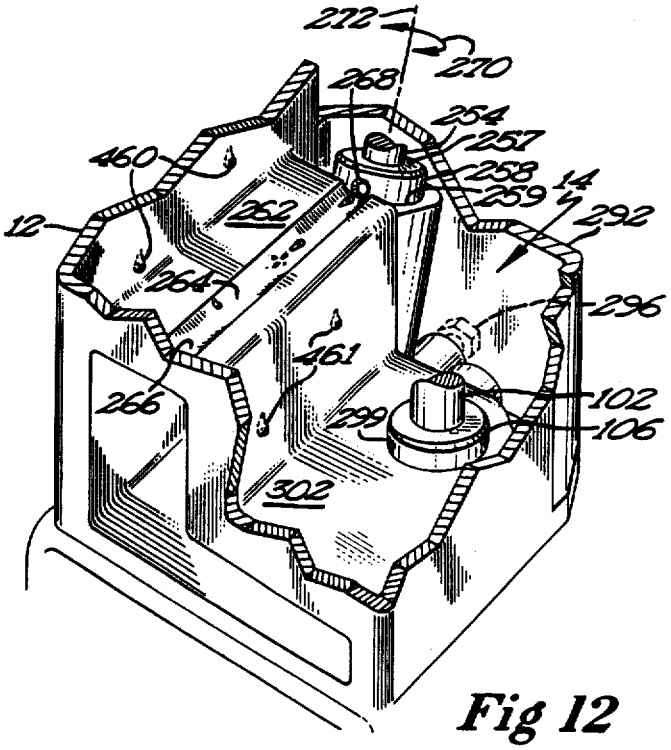
FIG. 12 is a rear perspective view of a lower portion of the drive train chamber of the sewing machine of FIG. 1 and wherein the housing of the machine is partially cut away.

Referring now to FIGS. 1, 7 and 12, the cam follower 246 is supported in and extends upwardly from cam follower arm 252 which is rigidly clamped to looper shaft 254 for movement with the shaft 254. A split collar 256 is interposed between the lower surface of follower arm 252 and the upper end 257 of looper shaft bearing 258. A second split collar (not shown) is clamped to the looper shaft 254 adjacent the lower end 28 of the looper bearing 258 and above looper holder 282 to limit axial movement of the looper shaft.

The looper shaft bearing 258 is received within an elongated looper shaft aperture 259 in the housing 12 and has its longitudinal axis 272 generally skew to the axis 98 of shaft 102. The aperture 259 extends from chamber 14 into the feed dog chamber 260.

Because the cam follower arm 252 oscillates through an arc 270 in response to rotation of the looper cam 176, it is desirable to provide adequate lubrication between the looper bearing 258 and looper shaft 254. Referring now to FIG. 12, the drive train chamber 14 within housing 12 has a generally horizontal, raised shelf 262 positioned rearwardly of looper bearing 258 and adjoining interior walls of the drive train chamber 14 so that oil 460 flowing down the interior walls of chamber 14 will reach shelf 262. A looper shaft oil accumulation trough 264 is formed in the shelf 262 and is inclined downwardly from end 266 toward the looper bearing 258, the trough 264 terminating against the bearing 258 with the bearing confronting and obstructing the lower end of the trough 264.

The looper bearing 258 has an oil port 268 which directly confronts and communicates with the trough 264 and extends between outer and inner peripheries 263 and 276, respectively, of the bearing so that oil accumulating within trough 264 flows downwardly into the oil port 268 and into bearing 258.

Figure 13:
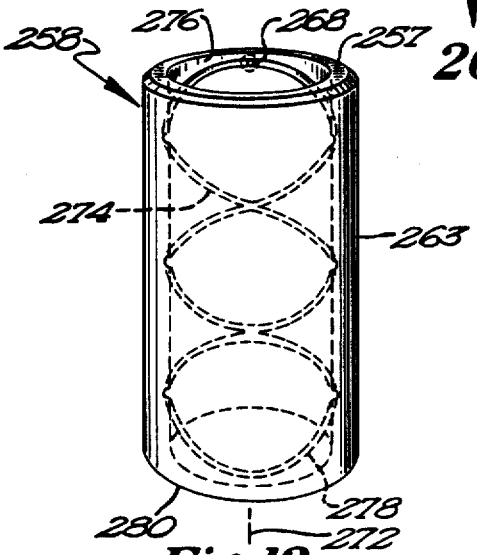
FIG. 13 is a perspective view of the looper shaft bearing in which an interior oil transmission channel is shown partially in phantom.

Referring next to FIG. 13, the looper shaft bearing 258 is provided with a continuous oil channel means 274 which extends entirely about the inner periphery 276 of the bearing and communicates with oil port 268. The three loops of the figure-eight type oil circulation channel 274 are positioned wholly within the inner periphery 276 of the bearing 258 and because the lower end 280 oil channel is spaced from the lower end 280 of the bearing oil is inhibited to some degree from escaping out the lower end 280 of the bearing. The looper bearing 258 thus encourages the oil that enters the channel 274 to remain therein and to not pass readily through the bearing into the feed dog chamber 260 positioned therebelow.

Figure 14:
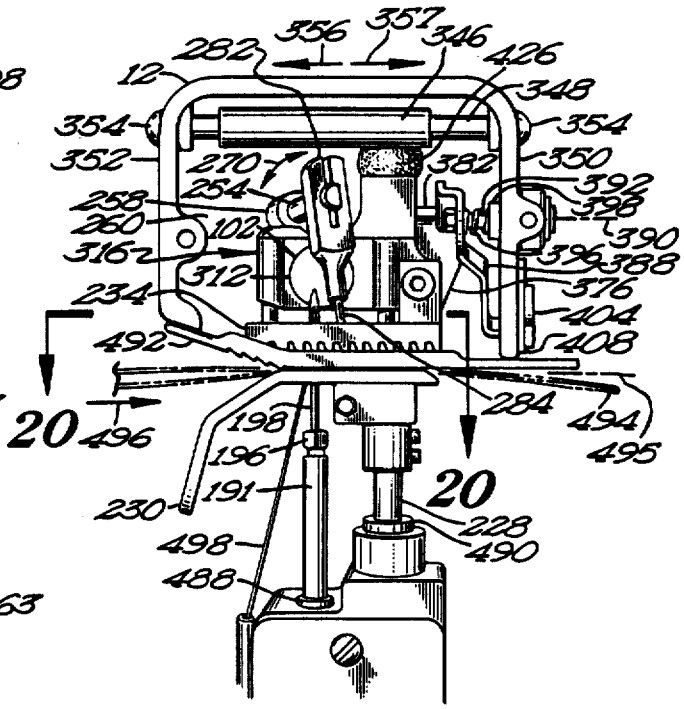
FIG. 14 is a bottom view of the feed dog chamber showing the interaction between feed dog, looper, needle driving and thread chain cutting assemblies.

Referring next to FIGS. 14 and 19, the looper shaft 254 extends downwardly from bearing 258 into the feed dog chamber 260 and at the lower end of the shaft has a looper holder 282 rigidly clamped to the shaft and carrying the looper 284 with its hooked end 286 which swings through arc 270 during operation. Since there is no movement between the looper holder 282 and the looper shaft 254, it is not essential that oil be directed to the looper holder. Some oil does drain out of bearing 258 and is useful to lubricate the interface between lower end 280 or the bearing and the split collar (not shown) which is fixed to the shaft 258 above the looper holder.

Looper cam 176, cam follower 246, arm 252, rotatably mounted looper shaft 254, looper holder 282 and looper 284 collectively comprise the looper assembly whose operation will be further described hereafter.

A plurality of weep holes 287 and 288 (FIGS. 1 and 7) are provided in the floor 290 of the drive train chamber 14 so that any excess oil acumulating at the bottom of the chamber may be released downwardly through the holes 287 and 288 into the fed dog chamber 260 to be distributed and used in the lower chamber 260, as will be described further hereafter. A cover plate 292 covers the front opening to drive train chamber 14 and is rigidly secured to the housing 12 by means of bolts 296 passed through the plate and into bores 294 as best shown in FIGS. 1 and 9. This cover plate, when bolted in position against the housing 12, forms a part of the housing and cooperates with the already described interior walls of chamber 14 to define the drive train chamber 14.

Figure 15:
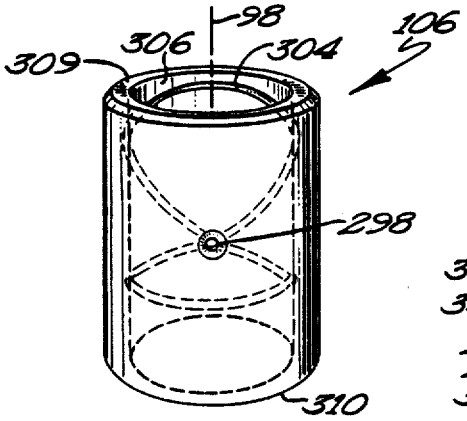
FIG. 15 is a perspective view of the lower main drive shaft bearing showing the interior oil channel in phantom.

The main drive shaft 102 extends downwardly from the drive train chamber 14 along connecting aperture 299 and into feed dog chamber 260, being journaled in lower main drive shaft bearing 106, as it passes between the chambers. The bearing 106, as shown in FIGS. 5 and 15, has a countersunk oil inlet port 298 which directly confronts and communicates with oil bore 636 through housing 12.

The lower main drive shaft bearing 106 has upper and lower ends 309 and 310, respectively, and is provided with an oil channel 304 cut into the inner periphery 306 of the bearing 106 and communicating with oil port 298.

The oil channel has a figure-eight configuration wherein the oil port 298 intersects the junction of the upper and lower loops of the figure-eight. The shown oil channel 304 receives oil from the oil port 298 and distributes the oil within the inner periphery 306 of the bearing, providing lubrication between the inner periphery and the shaft 102. Excess oil entering the channel 304 is discharged from the lower end 310 of the bearing by downward seepage, such oil discharge being directed into the feed dog chamber 260.

Figure 16:
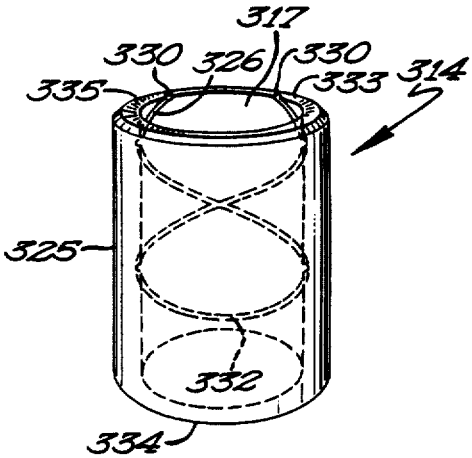
FIG. 16 is a perspective view of the feed dog bearing wherein the interior oil channel is shown in phantom.
Figure 17:
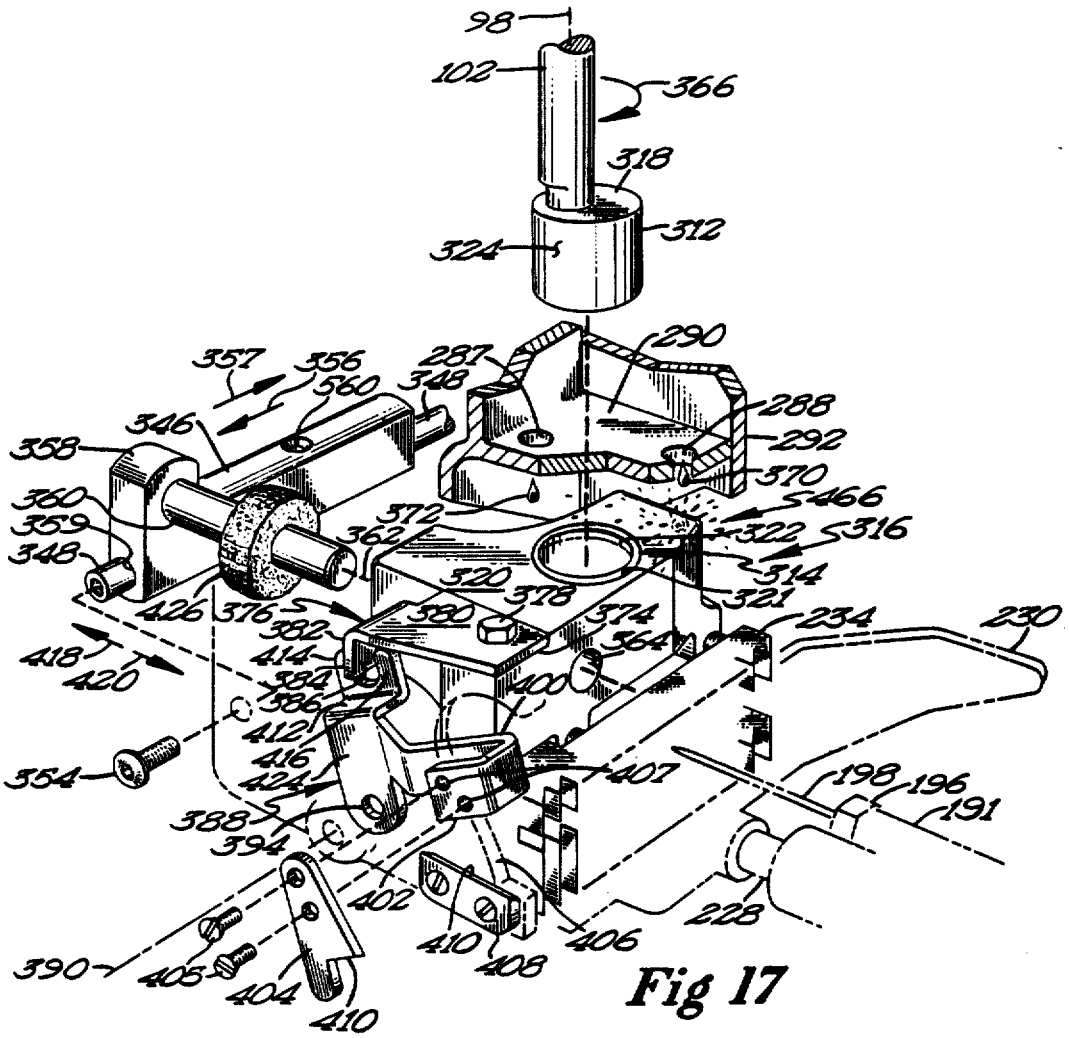
FIG. 17 is an exploded rear perspective view of the feed dog assembly and the thread chain cutting assembly with the machine housing being partially cut away or shown in phantom.

Referring now to FIGS. 7 and 17, drive shaft 102 has an offset eccentric 312 at the lower end thereof which is rotatably journaled in feed dog bearing 314 which is retained in drive shaft aperture 321 of the feed dog block 316. The upper surface 318 of the eccentric 312 is positioned slightly beneath the upper surface 320 of the feed dog block so that a feed dog block oil collection trough 322 is provided in the feed dog block and closely surrounding the main drive shaft. This feed dog block oil accumulation trough may also be provided by a chamfer 333 on the upper end 335 of feed dog bearing 314, the chamfer 333 being inclined downwardly from the outer periphery 325 to the inner periphery 317 as shown in FIG. 16.

Oil accumlating in the trough 322 works its way downwardly between the inner periphery 317 of the bearing 314 and the outer periphery 324 of eccentric 312 to provide needed lubrication between the eccentric and the bearing 314. This downward movement of oil is enhanced by providing the feed dog block bearing 314 with an interior-truncated figure-eight type oil channel 326 which is cut into the inner periphery 317 of the bearing 314, as best shown in FIG. 16. The channel means 326 has twin entries 330 which begin at the upper end 335 of the bearing, communicate with the trough 322 and accept oil for downward movement along the channel 326. It should be noted that the lower extremity 332 of the channel 326 is spaced from the lower end 334 of the bearing in order to encourage the bearing to retain oil therein and to inhibit downward flow of oil out of the lower end 334 of bearing 314. Because the feed dog block 316 is the lowest moving part requiring oiling, there is no need for oil flow below the feed dog block.

Referring now to FIGS. 1 and 17, the housing 12 includes the feed dog chamber 260 and perforated floor plate 338 at the lower end of the housing 12 which covers the open bottom 336 of chamber 260 during normal operation, the plate 338 being secured by screw 340. The housing also includes throat plate 342 which is secured to the side of the feed dog chambers by screws passed into bores 344, the plates 342 and 338 cooperating with the housing 12 to collectively define the feed dog chamber 260.

Referring now to FIGS. 1, 14 and 17, a slide 346 is mounted for sliding reciprocating movement in directions 356 and 357 along elongated rod 348 which passes through aperture 359 of the slide and is rigidly fixed to the side walls 350 and 352 of feed dog chamber 260 by screws 354 threaded into the terminal ends of the rod 348.

Extending laterally, transversely from an upwardly extending ear 358 of the slide is a cantilevered, circular cross-section fixed rod 360 having a central longitudinal axis 362.

A transverse bearing aperture 364 receives rod 360 therein for sliding axial movement of the block 316 along the rod 360. Accordingly, the slide 346 when mounted on rod 348 with cantilever rod 360 passing through the aperture 364 of the feed dog block, supports and guides the feed dog block 316 as the block moves in response to rotation of eccentric 312 of drive shaft 102. When drive shaft 102 rotates in direction 366, the feed dog block 316 describes an elliptical, and more specifically, a circular path as it slides axially along rod 360 and as slide 346 moves with feed dog block along rod 348. The path of the feed dog block will be discussed further hereafter in conjunction with a description of the operation of the looper assembly.

Rigidly fixed to the feed dog block 316 for movement with the block is a toothed feed dog 234 which confronts and intermittently bears against presser foot 230 during operation. Because the feed dog block moves in response to rotation of the drive shaft 102, the block will be moving in its generally circular path at a speed typically ranging between 1,000 and 1,500 revolutions per minute. As oil droplets 370 (FIG. 17) fall downwardly from weep hole 288 into the path of moving block 316 the rapidly moving feed dog block collides with the falling droplets 370 and scatters the fragmented remnants 466 of the droplets in all directions, creating a mist of oil within the feed dog chamber. Oil droplets 372 falling downwardly from weep hole 287 strike rod 348, and if the feed dog block 316 and slide 346 are in motion, the moving slide 346 will shatter the oil droplets 372 to further add to the oil mist.

A porous washer or gasket 426 formed of compressible, oil-absorbing material, such as felt, leather or the like, is positioned on the rod 360 between ear 358 and feed dog block 316 so that excess oil reaching the rod 360 is absorbed and stored by the washer 426 for subsequent release. The washer 426 is constructed such that it receives slight compression each time the feed dog block moves toward the ear 358 so that some quantity of oil is released onto the shaft 360 each time the washer 426 is compressed.

Slide 346, rods 348 and 360, feed dog block 316 with feed dog 234 collectively comprise a feed dog assembly usable with the portable bag closing machine 10.

Figure 18:
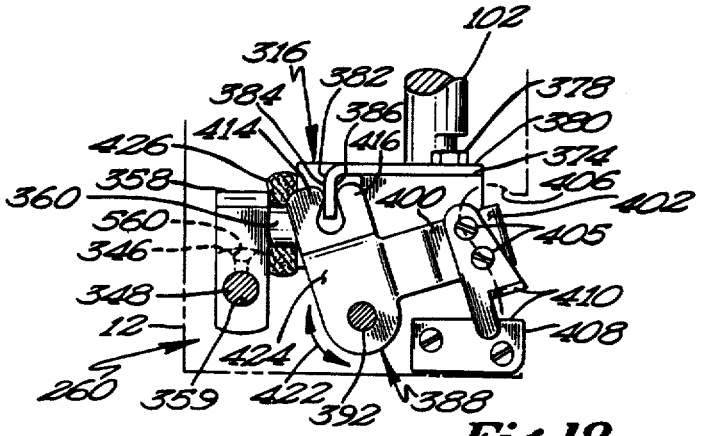
FIG. 18 is a rear view of the thread chain cutting and feed dog assemblies of FIG. 17.

Feed dog block 316 has a recessed ledge 374 in its top 320 as best shown in FIGS. 17 and 18, and a combined oil and motion transmitting member 376 is rigidly fixed to the ledge 374 by bolt 378.

The member 376 has a mounting segment 380 which fits tightly against the ledge 374 and is further provided with an angled segment 382 which extends downwardly from the mounting segment 380 at a right angle thereto and is positioned laterally of the feed dog block. The angled segment 382 is provided with front and rear surfaces 384 and 386, respectively, and these surfaces, as will be described further hereafter, serve both a motion-transmitting and an oil-transmitting function.

A knife bracket 388 is positioned primarily within the feed dog chamber 260 and is swingably mounted about axis 390 by pivot means such as cylindrical bearing assembly 392 (FIG. 18) which passes through aperture 394 in the knife bracket and extends inwardly from housing 12. A coil spring 396 (FIG. 14) is interposed between the bracket 388 and a raised boss 398 of the housing in order to bias the knife 404 against anvil 408.

Referring again to FIG. 17, the knife bracket 388 is movably mounted by the pivot means for swinging movement about the axis 390 and the bracket 388 includes an outwardly extending arm 400 which has a turned end portion 402 which carries knife 404. The end portion 402 passes through a cutaway section 406 of the housing to swing in its operating arc about axis 390. The moving knife 404 is fixed to the bracket by screws 405 which threadably engage bores 407. A stationary anvil 408 is fixed to the housing and cooperates with the knife 404 during swinging movement of the knife bracket. Preferably both knife 404 and anvil 408 are provided with sharpened cutting edges 410.

Coil spring 396 urges the knife bracket 388 away from boss 398 and causes the cutting edge 410 of moving knife 404 to closely contact the anvil 408 during cutting.

The knife bracket 388 has an L-shaped extension 412 positioned above the aperture 394 about which the bracket pivots. The extension 412 has a bifurcated arm with first and second bifurcations 414 and 416, respectively. The first bifurcation 414 closely confronts the front surface 384 and the second bifurcation closely confronts the rear surface 386 so that any components of movement of the feed dog block in directions 418 or 420 result in the angled segment 382 contacting either bifurcation 414 or 416 and causing the knife bracket to swing about pivot 392 in an arc 422, resulting in the moving knife 404 swinging toward anvil 408 and cutting the thread chain therebetween. It should be understood that the feed dog block does not move in purely straight-line fashion in directions 418 and 420 and in fact moves in a circular path. However, it should be understood that, while moving in the circular path defined by the eccentric 312, the feed dog block's movement does have some components which will be in directions 418 and 420. These motion components in directions 418 and 420 are used to move knife bracket 388 through arc 422.

It being understood that the feed dog block moves in a circular path in response to rotation of drive shaft 102 and its integral eccentric 312, it will be appreciated that some components of the circular movement will be directed along axis 390 in directions 356 or 357. Any movement of the block 316 in directions 356 or 357 causes the angled segment 382 to move relative to the bifurcations 416 and 418 alternately causing one or the other of the bifurcations to scrape against the front or rear surfaces 384 and 386, respectively. This scraping movement of the bifurcations against the front and rear surfaces of the angled segment 382 causes oil on the front and rear surfaces to accumulate on the bifurcations. The oil on the angled segment 382 originates from oil entering the feed dog chamber by weep hole 288 or seeping downwardly along the main drive shaft 102 or the looper shaft 254, much of such oil eventually reaching the upper surface 320 of the feed dog block. Rapid rotation of the drive shaft 102 and the consequent movement of the feed dog block tends to urge much of this oil radially outwardly along the top of the block due to centrifugal force, and some of this outwardly moved oil reaches the member 376 and flows down the angled segment 382. Naturally, some accumulation of oil on the angled segment also results from the presence of the oil mist in the feed dog chamber.

Accordingly, components of movement of the feed dog block in directions parallel to axis 390 impart no movement to knife bracket 388 but do cause oil to be accumulated on the bifurcations 414 or 416. Such accummulating oil flows downwardly along extension 412 until it reaches the segment 424 of the bracket, thereafter continuing its flow until it reaches the pivot screw 392 to provide needed lubrication to the assembly 392. Accordingly, the scraping action of the bifurcations 414 and 416 capture sufficient oil from angled segment 382 to produce a flow downwardly to the pivot screw so as to provide the necessary lubrication between screw 392 and the knife bracket 388.

The member 376, knife bracket 388, bearing assembly 392, knife 404 and anvil 408 collectively comprise a thread chain cutting device used with the machine 10 to sever the threads remaining after the bag-stitching job is completed.

OPERATION OF THE INVENTION

In operation, the self-oiling portable sewing machine 10 is firmly grasped by the operator's hand encircling the handle 16 and generally held in the shown operating position of FIG. 1 in which the handle 16 is at the top of the machine and the needle 198 at the bottom. The operator visually inspects the oil reservoir 40 to confirm that the oil level 60 therein is at an adequate level and adds oil to the reservoir 40 through filling aperture 62 if needed. The inspection is greatly simplified by the generally transparent or translucent wall 58 of the reservoir which permits the operator to readily determine the internal oil level by casual visual inspection.

The operator depresses plunger button 68 in direction 69 as best seen in FIG. 3. As the button 68 moves downwardly, the seals 72 and 73 of plunger 63 also move downwardly within pump chamber 48, slidably, sealably engaging the sidewall 66 during movement. The lower gasket 76 forces oil located beneath such gasket downwardly through passage 80, the pressure generated by the downward movement of gasket 76 causing the ball 82 of the outlet valve to move downwardly against spring 83, thereby creating an annular opening about valve seat 81 through which the oil moves downwardly into exit chamber 84 and out outlet 86. As the plunger 63 moves upwardly in direction 69a as a result of the upwardly directed spring pressure generated by compressed spring 78, the pressure within pump chamber 48 is reduced and the spring 83 urges valve ball 82 back into closed position on valve seat 81, thereby blocking further downward flow of oil into the exit chamber 84 until the plunger 63 is again depressed. This blocking action of the valve ball 82 assures that an adequate but not excess supply of oil is delivered to the drive train chamber.

As the plunger 68 moves in direction 69a in pump chamber 48 on its return to the rest position shown in FIG. 3, the reduced pressure at the bottom of the pump chamber 48 causes the inlet check valve 51 to open. The higher pressure within the reservoir 47 forces the ball valve 57 toward the pump chamber and sufficiently overcomes the restoring force of spring 55 to move the ball to an open position, permitting oil to flow from the reservoir 40, through sleeve 52 and thence through channel 49 to the pump chamber 48 where such oil is then stored until the plunger 63 is depressed. As the plunger 63 moves upwardly to the rest position shown in FIG. 3 and oil flows into chamber 58, the pressure difference between pump chamber 48 and the oil reservoir 40 diminishes and ball valve 57 moves to the shown closed position against valve seat 53, thereby preventing an excess flow of oil from the reservoir to the pump.

Oil forced out of pump chamber 48 and into exit chamber 84 flows downwardly indirection 428 as a result of pump pressure and also gravity flow, the oil moving along hose 88 and then through nipple 90 (FIG. 4) into oil manifold 89. Such oil then enters the central plenums 608 and 622 and some of the oil flows from first outlet port 610 into oil port 114 of the upper main drive shaft bearing 104. Such oil entering the bearing 104 flows along the oval oil channel 120 within the bearing to provide through lubrication for the bearing. Oil within the bearing 104 gradually works its way downward by seepage between the drive shaft 102 and the inner periphery 113 of the bearing to eventually emerge at the bottom 124 of the bearing.

As a result of the pumping of plunger 63, which may be actuated two or more times by an operator before actuation of the sewing machine, the hose 88 and the plenums 608 and 622 are filled with oil, and the oil in hose 88 works its way into the manifold 89 for slow subsequent discharge from the outlet ports of the manifold. Oil bypassing the outlet port 610 flows from the upper manifold 600 downwardly through the aperture 616 in the housing 12 and into the plenum 622 of the lower manifold 602. The sealing rings 612 and 618, which contact the outside of the housing 12, provide an oil-tight seal between the upper manifold and the housing to prevent oil seepage on the outside of the housing.

Oil in the lower plenum 622 flows laterally with a portion of such oil leaving the lower manifold along nozzle 630 for direct discharge 650 (FIG. 9) onto the needle driving assembly from nozzle 630. Oil 650 discharged from the nozzle 630 works its way downwardly by gravity flow and is also flung in outward directions by the movement of the needle driving assembly. It will also be appreciated that during the starting and stopping of the sewing machine, the needle driving assembly gradually increases and decreases its speed of movement. Such changes in speed cause the oil on the needle driving assembly to be thrown outwardly with varying degrees of force, thereby assuring that the oil is distributed over a wider area for oiling of other internal sewing machine parts.

Oil within the lower manifold 602 is also forced out of the plenum 622 through hose 632 which channels it to the lower main drive shaft bearing 106 as shown in FIGS. 22 and 5.

After manual pump actuation, oil is also stored in hose 632 for gradual delayed flow to the lower main drive shaft bearing 106. Oil leaving hose 632 enters nipple 634 and seeps slowly through oil bore 636 to oil inlet 298 in the lower drive shaft bearing 106. Oil then slowly enters the figure eight oil channel 304 as best shown in FIG. 15 to provide needed lubrication to the drive shaft 102. Excess oil from the channel 304 works its way downwardly by seepage between the drive shaft 102 and the inner periphery 306 of the bearing, leaving the bearing at its lower end 310.

As the motor 30 begins its rotation in response to the operator depressing push button switch 26, the slight vibration of the motor assists the oil flow from the exit chamber 84 to the nozzle 630 and to the main bearings 104 and 106, permitting oil flow from within the chamber 84 downwardly in direction 428 through tubing 88. As oil flows slowly out of the reservoir 40, ambient air enters the reservoir through vent aperture 119, passing through a filter (not shown) to vent the reservoir and assure continued downward flow from the reservoir whenever the valve 51 opens. The use of a filter assures that no dirt, dust or other foreign elements enter the oil reservoir to produce clogging or abrasion in the machine.

Referring now to FIGS. 1, 4, and 22, oil flow moves from oil manifold 89 into countersink 118 of the oil port 114 of the upper main drive shaft bearing 104. If the drive shaft 102 is stationary, the oil flows from oil port 114 and primarily downwardly along the generally oval channel 120, as best shown in FIG. 5, the oil leaving the bearing 104 at its lower end 124 and dripping downwardly as shown by oil drops 432 (FIG. 7). The drops 432 normally flow downwardly along eccentric collar 138 when the shaft 102 is stationary.

Oil drops 432 working their way out of the lower end 124 of the bearing 104 flow onto the raised projection 148 (FIGS. 7 and 8) of the eccentric collar 138 and, particularly when the motor 30 is off, oil works its way downwardly onto the surface 141 of the eccentric and into oil accumulation groove 139 for downward seepage between the surfaces 143 and 441 to provide lubrication and encourage free rotational movement of the eccentric relative to surface 441. Some oil on the surface 141 drains downwardly through oil bores 137 such as drop 454 to fall onto the looper cam 176 as will be described further hereafter.

Oil droplets such as 454 leaving the oil bore 137 of the eccentric fall on the upward projection 240 of the looper cam and flow downwardly to the surface 250, some of the oil dropping down through oil flow hole 247 into cam follower slot 244 to be picked up by the cam follower 246 to provide lubrication, it being understood that the oil droplets 455 are also spread about and distributed along the slot 244 by the moving cam follower 246 to assure adequate lubrication between the cam follower and its slot.

When the operator depresses switch 26, the electric motor 30 is energized and begins rotating. Rotation of pulley 132 by the motor shaft turns belt 130, causing pulley wheel 126 to rotate and to move main drive shaft 102 in direction 366 at a speed of approximately 1,000 to 1,500 revolutions per minute depending on the loading of the machine and on its general age and condition.

When drive shaft 102 is rotating, the centrifugal force generated by the rotating eccentric collar 138 and looper cam 176, as well as inertial forces associated with moving connecting rod 146, tend to fling much of the oil on these structures radially outwardly from the axis 98 of shaft 102 and toward the interior walls of the drive train chamber 12. As the speed of the eccentric and the looper cam increases and decreases in response to start-up and stoppage, the centrifugal force applied to such oil droplets varies and accordingly the outward path of the hurled oil droplets will sometimes be almost horizontal as with droplets 458 (FIG. 9) and at other times they will drop more rapidly in a hyperbolic arc as shown by the droplets 458 in FIG. 7, thus resulting in a well-distributed spray of oil. The outwardly flung oil 458 from collar 138 and cam 176, if not intercepted by the machine's internal components, strikes the inner walls of the drive train chamber 14 and is fragmented into a multiplicity of fine oil droplets to create a mist of oil throughout the drive train chamber, such mist working its way into virtually all moving parts and covering all surfaces which are exposed to it.

As a fine layer of oil accumulates on the various moving parts and bearings, such oil tends to work its way into the bearings and internal chambers, passages and channels by capillary action as well as by gravity flow. The interaction of the various oiling methods described herein such as gravity flow, spraying of oil, the creating of an oil mist, wicking, and capillary action collectively assure a more effective composite oiling system than any yet used with a portable bag-closing sewing machine.

In addition to establishing the described mist, oil droplets thrown outwardly against the walls of the drive train chamber 14 also tend to accumulate to a degree on the walls of the chamber 14 and eventually coalesce to form larger droplets 460 which drain downwardly toward shelf 262 and the surface 302 as best shown in FIG. 12.

Oil droplets 460 accumulate on shelf 262 and work their way into looper shaft oil accumulation trough 264 which is inclined downwardly toward the oil inlet port 268 to encourage flow toward the port 268. As oil enters port 268, it moves through the wall of the looper shaft bearing 258 and enters channel means 274 within the bearing, as best shown in FIG. 13. The oil works its way along channels 474 by gravity flow to provide comprehensive lubrication to the inner periphery 276 of the bearing and assure smooth rotation between looper shaft 254 and looper bearing 258. Because the lowermost extremity 278 of the channel means 274 does not communicate with the lower end 280 of the bearing, oil leaves the bearing 258 relatively slowly and only by slight and gradual seepage.

Oil supplied along hose 632 to lower main drive shaft bearing 106 enters oil inlet port 298 in lower main drive shaft bearing 106 and moves through the port to the oil channel 304 (FIG. 15) situated on the inner periphery 306 of that bearing. The oil moves along channel 304 providing lubrication to main drive shaft 102 for easy rotation within the bearing, the oil then slowly draining out the bottom 310 and flowing downwardly along main drive shaft 102 as best shown by oil droplet 462 in FIG. 7. Droplets 462 on the outer periphery of the drive shaft 102 will flow downwardly to feed dog block 316 if the drive shaft is stationary, but if the motor 30 is operating, the rapid rotation of drive shaft 102 is likely to hurl the droplets 462 outwardly, as shown by droplets 464, and against the walls of the feed dog chamber 260 to shatter the drops against the chamber, forming a mist of oil within chamber 260. This oil mist tends to work its way into virtually all of the moving parts within chamber 260.

Oil droplets from exit 308 of lower bearing 106, or from downward flow from weep hole 288, or those which settle out of the described oil mist, eventually accumulate on the upper surface 320 of feed dog block 316 (FIG. 17) and these droplets accumulate in trough 322 when the motor 30 is off and the block 316 is stationary. Oil within trough 322 works its way through entries 330 in the upper end 335 of feed dog bearing 314 (FIG. 16) and thence moves along oil channel 326 within the bearing to provide needed lubrication for the eccentric 312 to rotate freely within bearing 314. Channel means 326 of bearing 314 terminates short of the lower end 334 of the bearing so that oil within channel 326 is retained within the bearing for a longer interval and only escapes slowly by seepage. There is no compelling reason for encouraging downward seepage of the oil out of the lower end of bearing 314 because there are no moving parts beneath the bearing which require lubrication.

When the motor 30 is actuated while a quantity of oil is retained in oil collection trough 322, such oil 464 (FIG. 7) is hurled outwardly by centrifugal force applied to the moving block 316 and flows radially outwardly from shaft 102 to the outer edges of the feed dog block 316 and much of such oil is hurled against the walls of feed dog chamber 260 to add to the intensity of the oil mist within the chamber.

Referring now to FIGS. 7 and 17, oil accumulating near the bottom of the drive train chamber 14 is discharged from chamber 14 through weep holes 287 and 288. Oil 370 passing downwardly through weep hole 288 is likely to be intercepted by feed dog block 316 during its normal movement in response to rotating eccentric 312. When droplets 370 are intercepted by the rapidly moving feed dog block 316 the droplet is shattered, as best shown at 466, to further add to the oil mist within feed dog chamber 260. In the event the feed dog block is stationary when the oil 370 falls, it is more likely to accumulate on surface 320 of the feed dog block and subsequently reach the trough 322 or be hurled outwardly when the machine is next actuated.

Similarly, oil droplets 372 discharged from weep hole 287 are likely to land on rod 348 or be intercepted by moving slide 346. If intercepted by the slide, the droplet 372 is likely to be shattered and further contributes to the intensity of the oil mist within the chamber. Should the machine be inactive, the droplet 372 will be received on rod 348 and be used for lubrication of the rod for improved sliding movement of the slide 346. Naturally, the weep holes 287 and 288 also serve a useful function in preventing any unneeded over accumulation of oil on the bottom of the drive train chamber.

Oiling port 560 in the upper surface of slide 346 extends down to and communicates with slide aperture 359 to introduce oil to the interface between aperture 359 and rod 348. Oil reaches port 560 from oil drops sprayed outwardly by moving feed dog block 316 or from the oil mist within the chamber 260 and flows downwardly therein.

When motor 30 is actuated and causes the rotation of main drive shaft 102 in direction 366, as shown in FIG. 17, the movement of eccentric 312 results in the feed dog block 316 moving in a generally circular path centered on the axis 98 of the shaft. As the feed dog block follows the circular path prescribed by the eccentric 312, it carries along with it the slide 346 which has its rod 360 slidably received within bearing aperture 364. As the feed dog block 316 slides alternately in directions 418 and 420 along the rod 360, the slide 346 also moves in directions 356 and 357 to follow the movement of the feed dog block. Accordingly, the slide 346 which is slidably mounted on rod 348 provides support for the feed dog block 316, and various operating positions of the feed dog block and of slide 346 are illustrated in FIGS. 14, 19 and 21. In FIG. 19, the slide 346 is near its left-most extremity of rod 348 and closely adjacent wall 352. As the eccentric 312 turns in response to rotation of shaft 102, the feed dog block moves to the right, as viewed in FIGS. 14, 19 and 21, causing the slide 346 to move in direction 357. Since the feed dog block is moving in a circular path whose plane is perpendicular to the axis 98 of the drive shaft 102, the feed dog 234 also follows a circular path and alternately moves in direction 420 to bear against presser foot 230 and in direction 418 to recede from the presser foot as a bag 494 moves along its path 495 through the machine 10. This type of circular or elliptical movement of the feed dog block is found in most sewing machines and is used to advance the bag or fabric which is being sewed. Since such basic movement of a feed dog block to cause forward movement of a bag or fabric through the machine is well known to the art, it will not be described further here.

During the movement of feed dog block 316 along its circular path, the block slides along rod 360 toward and away from the ear 358. During such movement the block moves against oil-retaining annular gasket 426 causing oil stored in the porous gasket to be released onto the rod 360 to provide needed lubrication. Similarly, as the pressure of compression is removed from gasket 426, it soaks up any excess oil on rod 360 and stores it for future use.

It should be understood that the circular path followed by feed dog block 316 in response to rotation of eccentric 312 is centered on axis 98 and produces a total side-to-side displacement on the order of one-fourth to one-half inch. Accordingly, the movement of the angled segment 382 in direction 356 or 357 is such that one of the bifurcations 414 or 416 substantially always engages the angled segment 382. During the circular movement of block 316 it has components of movement in the directions 418 and 420, either of which results in the angled segment 382 swinging the knife bracket 388. Accordingly, when the feed dog block (FIG. 17) is moving in direction 420, the surface 386 of the angle clip contacts bifurcation 416, swinging knife bracket 388 about assembly 392 and bringing the L-shaped extension 402 of arm 400 downwardly toward the stationary anvil 408. Such movement results in the knife 404 moving downwardly with its cutting edge 410 closing on the cutting edge of the stationary anvil 408 to cut the thread chain therebetween.

As the feed dog block 316 moves in direction 418 in the course of its movement along the circular path, the surface 382 bears against bifurcation 414, swinging the knife bracket 388 about axis 390 and swinging the L-shaped portion 402 away from the stationary anvil 408, causing the moving knife 404 to rise to a cocked position in preparation for the next downward cut.

When the feed dog block in response to its movement along the circular path moves in direction 356 or 357, the angled segment 382 tends to have either its surface 384 or 386 scrape against bifurcation 414 or 416, respectively, resulting in the rubbing off of any excess oil on the surface 384 or 386 onto the bifurcation 414 or 416, respectively. The oil picked up by the wiping or scraping action of the angled segment 382 against the bifurcations accumulates and moves downwardly onto the surface 424 and works its way into the assembly 392 so as to provide adequate lubrication between the knife bracket 388 and the assembly 392.

The bottom of the feed dog chamber 260 is closed by a removable perforated plate 338 (FIG. 1), the perforations of the plate permitting the escape of any excess oil that might build up within the feed dog chamber, it being understood that oil coming to rest on plate 338 is of little use for lubricating the various components positioned above the plate and, accordingly, can be permitted to drain out or to evaporate into the atmosphere.

Referring again to FIGS. 1, 7 and 11, the rotation of looper cam 176 moves cam follower 246 continuously along the track 244 on the underside of cam 176. Accordingly, rotation of looper cam 176 causes the arm 262 to swing reciprocally through an arc 270 (FIGS. 14, 19 and 20), resulting in the looper shaft 254 and the looper 284 swinging through the arc 270 in which looper hook 286 follows a path 468, closely bypassing the needle 198. The operation of the looper in conjunction with the needle and the feed dog will be described further hereafter.

Referring now to FIGS. 1 and 8, as the drive shaft 102 turns about its longitudinal axis, eccentric collar 138 rotates therewith and causes the connecting rod 146 to move reciprocally in directions 162. Some of the oil deposited on the connecting rod 146 and on universal joint 152 by nozzle 630 is shaken off and hurled against the drive train chamber walls during movement of the rod 146. Such oil is deposited on other moving parts or is fragmented on the walls to further augment the oil mist within the drive train chamber. While there is some movement of the end 474 in directions 476, such movement is incidental and only the movement 162 plays a direct role in operating needle drive lever 156; such movement 476 of rod end 474 does, however, aid in flinging oil outwardly at the walls of chamber 14. Accordingly, longitudinal movement 162 is transmitted through universal joint 152 to needle drive lever 156 which swings through a small arc 478 about post 158.

Referring next to FIG. 9, oil 650 from nozzle 630 and oil droplets 458 hurled outwardly from the rotating shaft 102, eccentric 138 and looper cam 176 in direction 470 directly or indirectly lubricate the moving parts comprising the needle driving assembly and presser foot unit. Oil 650 and also droplets 458 striking the area of the universal joint 152 provide direct lubrication to it while droplets 468 which are fragmented against the inner wall of chamber 14 are broken up into tiny mist-like droplets which indirectly settle upon all parts in the chamber 14.

Wicking 180 which extends closely about joint 202 (FIG. 1) between housing 12 and needle drive lever 156 absorbs oil from chamber 14 and releases oil into joint 202 to provide oil to the joint 202 which works itself into the joint by a combination of capillary action and gravity flow. The rocking movement of lever 156 through arc 478 also assists in distributing oil more evenly in joint or interface 202.

Referring now to FIG. 9, oil originating from nozzle 630 flows downwardly along lever 156 into countersink 170. Additionally, some of the droplets 458 directly hit the countersink 170. Such oil enters oil port 168 to work its way into the annular oil slot 172 so as to provide lubrication between shaft 158 and needle drive lever 156. Accumulating sprayed droplets 472 on the lever 156 also work their way downwardly and some flow naturally into the countersink 170 to further add to the lubrication of the shaft 158.

As needle lever 156 rocks about post 158, the longitudinal shaft 164 moves longitudinally in directions 480 while pivoting about axis 482 and causes the needle drive shaft 191 to move in directions 192 and 484 to move the needle 198.

Referring now to FIG. 9, oil is introduced within the hollow interior 178 of longitudinal shaft 164 by oil-impregnated wicking 180. Oil released from the wicking passes outwardly through radial oil port 182 to lubricate the interface between shaft 164 and bearing surface 184. Naturally, oil is also deposited on the exterior surface of shaft 164, which extends outside sleeve 163, as a consequence of the oil mist within the chamber. Such oil is also used in the lubricating of the interface. The pivotal mounting between shaft 164 and clamp 188 is lubricated by oil deposited from the oil mist and additionally by oil released from the wicking 180 which passes in close contact with the pivot.

Needle drive shaft 191 slides in its bearings 488 and requires lubrication for the bearings which is supplied by the oil mist, oil flowing downward from nozzle 630, and from downward falling droplets 458 which settle on shaft 191 and work their way into the bearings.

Referring now to FIGS. 9 and 10, upper end 206 of the presser foot unit is lubricated by means of oil transferred to felt washer 216 by direct flow from the walls of the chamber 14 or by transfer from oil-impregnated wicking 180. Such oil enters the interface between bearing 212 and self-aligning insert 213, which is retained on post 208, to provide lubrication and permit free swinging of the lifter lever 204 about the post 208. Rod 222 telescopes into and out of hollow shaft 218 and the interface between shaft 218 and rod 222 is lubricated by oil entering the twin apertures 220, such oil being supplied by droplets 486 running down the exterior of lifter lever 204 and entering the holes 220. The lower end 224 (FIG. 1) of rod 222 is pivotally mounted to bifurcated clamp 226 and the pivotal mounting receives adequate lubrication from the oil mist established in the chamber and deposited on the mounting.

The presser foot shaft 228 is lubricated by deposition of oil thereon from mist and spray within the chamber 14 as well as from downward flow from nozzle 630, and such deposited oil works its way into the bearings 490 which slidably receive the presser foot shaft.

Referring now to FIGS. 14 and 21, the presser foot 230 exerts a positive force in the direction of throat plate 492 so as to urge the bag 494 into firm contact with the feed dog 234 and the presser foot 230 cooperates with the feed dog to permit moving of the bag in direction 496 during operation. As will be appreciated by those skilled in the art, the position of the needle shaft 191, the looper shaft 254 and the angular orientation of the eccentric of drive shaft 102 must be closely coordinated for the sewing machine components to function properly. The proper timing and interaction of the needle shaft, looper shaft, and feed dog is readily accomplished by properly positioning eccentric collar 138 and looper cam 176 on the drive shaft 102. Since such positioning is well known and understood by those skilled in the art, no detailed description of the angular relationships will be described herein.

In stitching a bag 494 closed with thread 498 from spool 503, the bag moves in direction 496 between the presser foot 230 and the feed dog 234, as best shown in FIGS. 14 and 21. Needle shaft 191 moves through an aperture in the presser foot, drives the needle 198 through the bag and through aligned apertures in the throat plate 492 and the feed dog 234, carrying the thread 498 well within the feed dog chamber, as best shown in FIGS. 14 and 20. As the needle 198 is well within the feed dog chamber, the looper shaft 254 and looper 284 are swinging toward the needle in direction 501 along path 468 that will cause looper hook 286 to move almost tangent to the circular periphery of the needle.

Referring now to FIGS. 21 and 23, as needle 198 withdraws from the feed dog chamber the thread 498 already carried within the chamber leaves a loop 500 which is immediately captured by hook 286 of the swinging looper 284 as it moves toward wall 352. As needle 198 is fully withdrawn (FIG. 19) the looper hook 286 completes its forward movement in direction 356 and, as it retains the loop 500, spreads it over opposed sides 502 and 504 of ramp 506 which is carried by the throat plate 492 (FIGS. 20 and 21). While the loop 500 is spread apart by cooperation of the looper hook 286 and the ramp 506, the needle 198 again descends toward the feed dog chamber 260 and through bag 494, at the end of which descent the needle will pass through the loop 500 and the looper will swing back to its starting position clear of the needle as shown in FIG. 14. Before the needle descends to catch loop 500, feed dog 234 moves in direction 357 and advances the bag 494 a predetermined distance so that the next downward thrust of the needle will pass through the bag at a new location to define the next stitch. As the needle moves through the bag 494 and through loop 500 the looper hook 286 releases the loop and movement of the needle causes the loop 500 to be pulled tight to form the stitch. As the needle begins its upward movement the looper shaft 254 swings again in direction 501 to engage the new loop and the looping process begins again.

As the bag 494 is stitched closed and leaves the machine, a chain stitch or thread chain is formed from the edge of the bag to the needle and must be severed to free the bag from the machine. To sever the chain, the operator swings the portable bag-closing machine such that the thread chain is urged between the anvil 408 and the moving knife 404.

While the preferred embodiments of the present invention have been described, it should be understood that various changes, adaptations and modifications may be made therein without departing from the spirit of the invention and the scope of the appended claims.

What is claimed is:

1. A self-oiling portable bag-closing sewing machine energizable from a power source, and capable of using thread to stitch a bag closed comprising:

a housing having an internal drive train chamber and said housing including a handle for carrying the machine;

first and second main drive shaft bearings, each said bearing having a central axis, each being carried by said housing, said bearings being positioned substantially coaxially, and each said bearing having an inner and an outer periphery, and an upper and a lower end;

driving means selectively connectable to the power source, carried by said housing, and including a motor and a main drive shaft rotably mounted in said first and second main drive shaft bearings for rotation about the longitudinal axis of said main drive shaft, and said main drive shaft extending within said drive train chamber and being drivingly connected with said motor to rotate said main drive shaft when the motor is energized;

a needle driving assembly including a needle having a longitudinal axis, said needle driving assembly being operatively movingly connected with said driving means to move said needle along said longitudinal axis of said needle in reciprocating movement in response to energizing of said driving means;

a feed dog assembly carried by said housing and operatively connected to said driving means to actuate said feed dog assembly for cooperation with said needle driving assembly in response to energizing of said driving means;

a presser foot unit carried by said housing and selectively bearing against said feed dog assembly and cooperating with said feed dog assembly to urge the bag against said feed dog assembly and thereby assist in moving the bag along a path past the needle;

a looper assembly carried by said housing and operatively connected with said driving means, said looper assembly cooperating with said reciprocating needle to form a stitch with the thread so as to cause the bag to be stitched closed as the bag moves along the path;

an oil reservoir capable of storing the oil and carried by said housing;

a selectively actuated pump having an inlet and outlet;

said inlet of said pump being connected in fluid flow relationship with said oil reservoir to receive oil from said reservoir; and oil delivery means connected in fluid flow relationship with said outlet of said pump and *connected* to said housing to direct oil [into said drive train chamber and into] *to* at least one of said main bearings [to lubricate said bearing and to cause excess oil discharge from said bearing and onto said main drive shaft for dispersion of the oil by outward flinging from said drive shaft] *and* onto at least one of said assemblies [during rotation of said driveshaft].

2. The self-oiling portable bag-closing sewing machine of claim 1 wherein said bearing includes an oil port passing between said inner and outer peripheries and further includes an oval oil channel in said inner periphery and communicating with said oil bore.

3. The self-oiling portable bag-closing sewing machine of claim 1 wherein said bearing includes an oil port passing between said inner and outer periphery and further includes a figure eight oil channel in said inner periphery and communicating with said oil bore.

4. The self-oiling, portable bag closing sewing machine of claim 1 wherein:

said oil delivery means includes an oil manifold carried by said housing;

said manifold including a manifold inlet port connected in fluid flow relationship with outlet of said pump;

said manifold further including first and second manifold outlet ports;

said first manifold outlet port being connected in fluid flow relationship with said first main driveshaft bearing to deliver oil to said first bearing; and said second manifold outlet port being connected in fluid flow relationship with said second main driveshaft bearing to deliver oil to said second bearing.

5. The self-oiling, portable bag closing sewing machine of claim 4 wherein said oil delivery means includes a first hose connected between said pump outlet and said oil manifold for transferring of oil and for storing a predetermined quantity of oil in said first hose for delayed gravity-flow distribution to said first bearing.

6. The self-oiling, portable bag closing sewing machine of claim 4 wherein said oil manifold further includes:

a third oil outlet port; and a nozzle connected in fluid flow relationship with said third oil outlet port and directed at said needle driving assembly for direct discharge of oil onto said needle driving assembly when said pump is actuated.

7. The self-oiling, portable bag closing sewing machine of claim 4 wherein said oil delivery means includes a second hose connected between said oil manifold and said second bearing for delivery of oil to said second bearing and to store a predetermined quantity of oil in said second hose for delayed gravity flow distribution to said second bearing.

8. The self-oiling, portable bag closing sewing machine of claim 1 wherein:

said handle includes a recessed slot;

said pump and said oil reservoir are contiguous and combined as an integral body; and said integral body is carried by said handle in said slot for convenient actuation of said pump by an operator.

9. The self-oiling, portable bag closing sewing machine of claim 1 wherein said pump includes a first check valve positioned adjacent said pump outlet to open during outflow from said pump and to otherwise remain in closed position to meter the oil flow from said pump.

10. The self-oiling, portable bag closing sewing machine of claim 1 wherein said pump includes a second check valve adjacent said pump inlet to meter the oil flow from said reservoir to said pump.

11. A self-oiling portable bag-closing sewing machine energizable from a power source, and capable of using thread to stitch a bag closed comprising:

a housing having an internal drive train chamber and said housing including a handle for carrying the machine;

first and second main drive shaft bearings, each said bearing having a central axis, each being carried by said housing, said bearings being positioned substantially coaxially, and each said bearing having an inner and an outer periphery, and an upper and a lower end;

driving means selectively connectable to the power source, carried by said housing, and including a motor and a main drive shaft rotatably mounted in said first and second main drive shaft bearings for rotation about the longitudinal axis of said main drive shaft, and said main drive shaft extending within said drive train chamber and being drivingly connected with said motor to rotate said main drive shaft when the motor is energized;

a needle driving assembly including a needle having a longitudinal axis, said needle driving assembly being operatively movingly connected with said driving means to move said needle along said longitudinal axis of said needle in reciprocating movement in response to energizing of said driving means;

a feed dog assembly carried by said housing and operatively connected to said driving means to actuate said feed dog assembly for cooperation with said needle driving assembly in response to energizing of said driving means;

a presser foot unit carried by said housing and selectively bearing against said feed dog assembly and cooperating with said feed dog assembly to urge the bag against said feed dog assembly and thereby assist in moving the bag along a path past the needle;

a looper assembly carried by said housing and operatively connected with said driving means, said looper assembly cooperating with said reciprocating needle to form a stitch with the thread so as to cause the bag to be stitched closed as the bag moves along the path;

an oil reservoir capable of storing the oil and carried by said housing;

a selectively actuated pump carried by said housing and having an inlet and outlet with said inlet connected in fluid flow relationship with said oil reservoir to receive oil from said reservoir; and oil delivery means connected in fluid flow relationship with said outlet of said pump and to said housing to direct oil into said drive train chamber and onto said needle driving assembly to lubricate said needle driving assembly and to cause excess oil deposited on said needle driving assembly to be dispersed within said housing by outward flinging from said needle driving assembly during operational movement of said needle driving assembly.

*12. The portable bag-closing sewing machine of claim 1 wherein said oil delivery means includes means for directing oil to said drive train chamber.*

*13. The portable bag-closing sewing machine of claim 1 wherein said bearing includes means for lubricating the main drive shaft with oil directed from said oil delivery means.*

*14. A portable sewing machine for closing bags comprising:*

*a housing having an internal chamber;*

*a driving assembly at least part of which is contained within said housing and including a drive shaft;*

*bearing means for rotatably retaining the drive shaft within said housing;*

*a reservoir for storing oil;*

*a selectively actuated hand pump coupled to said reservoir; and*

*oil delivery means coupled to said hand pump for directing oil pumped from said hand pump to the internal chamber of said housing.*

*15. The portable sewing machine of claim 14 wherein said oil delivery means comprises means for directing oil to said bearing means.*

*16. The portable sewing machine of claim 14 further comprising:*

*a needle driving assembly; and*

*means for directing oil onto said needle driving assembly.*

*17. The portable sewing machine of claim 15 wherein said means for directing oil to said bearing means comprises means for lubricating said drive shaft.*

*18. A portable hand-held sewing machine for closing bags comprising:*

*a housing having an internal chamber;*

*a driving assembly at least part of which is contained within said housing;*

*bearing means for rotatably retaining at least a portion of the driving assembly within said housing;*

*a single external oil reservoir attached to said housing for securely storing more than a temporary supply of oil;*

*oil distribution means for directing oil from said reservoir to the internal chamber of said housing to lubricate the driving assembly during operation of the sewing machine.*

*19. The portable sewing machine of claim 18 wherein said oil distribution means includes means for directing oil from said reservoir to said bearing means for lubricating said driving assembly.*

*20. The portable sewing machine of claim 18 further comprising a needle driving assembly, and wherein said oil distribution means includes means for directing oil from said reservoir to said needle driving assembly.*

*21. The portable sewing machine of claim 18 wherein said bearing means includes upper and lower main bearings, and wherein said oil distribution means includes means for directing oil to said upper and lower main bearings for lubricating said driving assembly.*

*22. The portable sewing machine of claim 18 further comprising a feed dog assembly, and wherein said oil distribution means includes means for directing oil to said feed dog assembly.*

*23. The portable sewing machine of claim 18 further comprising a presser foot assembly, and wherein said oil distribution means includes means for directing oil to said presser foot assembly.*

*24. The portable sewing machine of claim 18 further comprising a looper assembly, and wherein said oil distribution means includes means for directing oil to said looper assembly.*

*25. The portable sewing machine of claim 18 wherein said oil distribution means includes means for metering the amount of oil directed to said internal chamber.*

*26. The portable sewing machine of claim 25 wherein said metering means prevents oil from being directed to said internal chamber when said sewing machine is not operating.*

*27. The portable sewing machine of claim 18 wherein said oil distribution means includes a selectively actuated hand pump coupled to said oil reservoir to inject oil into said internal chamber.*

*28. The portable sewing machine of claim 27 wherein said oil distribution means includes manifold means coupled between said hand pump and said bearing means for directing oil to said bearing means.*

*29. The portable sewing machine of claim 27 further comprising:*

*a needle driving assembly; and*

*nozzle means coupled between said hand pump and said needle driving assembly for directing oil onto said needle driving assembly.*

*30. The portable sewing machine of claim 27 wherein said bearing means comprises upper and lower main bearings, and wherein said oil distribution means includes manifold means coupled between said hand pump and said upper and said lower main bearings for directing oil to said bearings.*

*31. A self-oiling portable bag-closing sewing machine energizable from a power source, and capable of using thread to stitch a bag closed comprising:*

*a housing having an internal drive train chamber and said housing including a handle for carrying the machine;*

*first and second main drive shaft bearings, each said bearing having a central axis, each being carried by said housing, said bearings being positioned substantially coaxially, and each said bearing having an inner and an outer periphery, and an upper and a lower end;*

*driving means selectively connectable to the power source, carried by said housing, and including a motor and a main drive shaft rotatably mounted in said first and second main drive shaft bearings for rotation about the longitudinal axis of said main drive shaft, and said main drive shaft extending within said drive train chamber and being drivingly connected with said motor to rotate said main drive shaft when the motor is energized;*

*a needle driving assembly including a needle having a longitudinal axis, said needle driving assembly being operatively movingly connected with said driving means to move said needle along said longitudinal axis of said needle in reciprocating movement in response to energizing of said driving means;*

*a feed dog assembly carried by said housing and operatively connected to said driving means to actuate said feed dog assembly for cooperation with said needle driving assembly in response to energizing of said driving means;*

*a presser foot unit carried by said housing and selectively bearing against said feed dog assembly and cooperat-*

*ing with said feed dog assembly to urge the bag against said feed dog assembly and thereby assist in moving the bag along a path past the needle;*

*a looper assembly carried by said housing and operatively connected with said driving means, said looper assembly cooperating with said reciprocating needle to form a stitch with the thread so as to cause the bag to be stitched closed as the bag moves along the path;*

*a single external oil reservoir capable of securely storing and retaining more than a temporary supply of oil, said oil reservoir being carried by said housing; and*

*oil delivery means connected in fluid flow relation with said oil reservoir and with said housing to direct oil to said drive train chamber and onto at least one of said assemblies for dispersion within said drive train chamber by outward flinging of such oil within said chamber by at least one of said assemblies during operation of the sewing machine.*

*32. The portable sewing machine of claim 31 further comprising metering means coupled between said oil reservoir and said drive train chamber for metering the oil directed to said drive train chamber.*

*33. The portable sewing machine of claim 32 wherein said oil delivery means includes means for directing oil at said main bearings to lubricate said drive shaft.*

*34. The portable sewing machine of claim 33 wherein said metering means assures that oil is delivered to said main bearings for lubricating said drive shaft during operation of said sewing machine.*

*35. The portable sewing machine of claim 31 wherein said sewing machine is a hand-held, lightweight sewing machine operable in a plurality of orientations.*

*36. The portable sewing machine of claim 18 or 31 wherein said oil reservoir securely retains said oil therein regardless of orientation of said sewing machine.*

*37. The portable sewing machine of claim 18 or 31 wherein said oil delivery means directs oil to said drive train chamber regardless of the orientation of said sewing machine.*

*38. The portable sewing machine of claim 18 or 31 wherein said oil reservoir includes external means for determining the level of oil retained therein.*

* * * * *

UNITED STATES PATENT AND TRADEMARK OFFICE

CERTIFICATE OF CORRECTION

PATENT NO. : RE.33,382

DATED : October 16, 1990

INVENTOR(S) : Robert J. Robinson and David B. Johnson

It is certified that error appears in the above-identified patent and that said Letters Patent is hereby corrected as shown below:

ON THE TITLE PAGE: Item [75]

Inventors: "Add" the inventor -- Verdell H. Schroeder, Minneapolis, Minnesota --

Signed and Sealed this

Tenth Day of November, 1992

*Attest:*

DOUGLAS B. COMER

*Attesting Officer*

*Acting Commissioner of Patents and Trademarks*